(12) United States Patent
Suzuki et al.

(10) Patent No.: US 7,936,435 B2
(45) Date of Patent: May 3, 2011

(54) LIQUID CRYSTAL DEVICE, METHOD FOR PRODUCING THE SAME, AND ELECTRONIC APPARATUS

(75) Inventors: Katsumi Suzuki, Suwa (JP); Tamotsu Goto, Chino (JP); Toshihiro Otake, Okaya (JP)

(73) Assignee: Seiko Epson Corporation (JP)

( * ) Notice: Subject to any disclaimer, the term of this patent is extended or adjusted under 35 U.S.C. 154(b) by 346 days.

(21) Appl. No.: 12/271,949

(22) Filed: Nov. 17, 2008

(65) Prior Publication Data

US 2009/0135352 A1     May 28, 2009

(30) Foreign Application Priority Data

Nov. 28, 2007    (JP) .................. 2007-306952

(51) Int. Cl.
*G02F 1/1339* (2006.01)
*G02F 1/1335* (2006.01)
*G02F 1/13* (2006.01)
*G02F 1/1341* (2006.01)

(52) U.S. Cl. ........ 349/156; 349/114; 349/106; 349/187; 349/189

(58) Field of Classification Search .................. 349/156, 349/114, 106, 187.189
See application file for complete search history.

(56) References Cited

U.S. PATENT DOCUMENTS

| 7,535,530 | B2 * | 5/2009 | Teramoto et al. .............. 349/117 |
| 2007/0252927 | A1 * | 11/2007 | Ichihashi et al. .............. 349/106 |
| 2009/0141214 | A1 * | 6/2009 | Suzuki et al. ................... 349/75 |
| 2009/0195732 | A1 |  8/2009 | Teramoto et al. |

FOREIGN PATENT DOCUMENTS

| JP | 2005-338256 | 12/2005 |
| JP | 2006-292847 | 10/2006 |
| JP | 2006-317799 | 11/2006 |
| JP | 2007-241071 | 9/2007 |
| JP | 2007-279379 | 10/2007 |
| JP | 2007-304497 | 11/2007 |

* cited by examiner

*Primary Examiner* — Mike Qi
(74) *Attorney, Agent, or Firm* — Harness, Dickey & Pierce, P.L.C.

(57) ABSTRACT

A liquid crystal device includes a pair of substrates; a liquid crystal layer sandwiched between the pair of substrates; a plurality of pixels each including a plurality of pixel regions, each of the pixel regions having a reflective display region and a transmissive display region; a phase difference film provided in the reflective display region, the phase difference film being located at a side of one substrate of the pair of substrates adjacent to the liquid crystal layer; and a partition wall member having light-shielding properties, the partition wall member being provided at the side of the one substrate adjacent to the liquid crystal layer to partition the phase difference film.

19 Claims, 10 Drawing Sheets

| SOLUTE CONCEN-TRATION (wt%) | 30 | 40 | 50 | 60 | 70 | 80 | 90 |
|---|---|---|---|---|---|---|---|
| HEATING AT 70°C | DIS-SOLVED | ⇐ | ⇐ | ⇐ | ⇐ | ⇐ | IN-SOLUBLE |
| LEFT AT ROOM TEMPERATURE 8H | DIS-SOLVED | ⇐ | ⇐ | ⇐ | ⇐ | PRECIPI-TATED | — |
| LEFT AT ROOM TEMPERATURE 24H | DIS-SOLVED | ⇐ | ⇐ | PRECIPI-TATED | PRECIPI-TATED | — | — |
| LEFT AT ROOM TEMPERATURE 100H | DIS-SOLVED | ⇐ | ⇐ | — | — | — | — |
| EVALUATION | ○ | ○ | ○ | × | × | × | × |

LIQUID CRYSTAL DEVICE, METHOD FOR PRODUCING THE SAME, AND ELECTRONIC APPARATUS

BACKGROUND

1. Technical Field

The present invention relates to a liquid crystal device including a reflective display region and a transmissive display region, a method for producing the liquid crystal device, and an electronic apparatus.

2. Related Art

Among liquid crystal devices, there is known a liquid crystal display including an array substrate having a plurality of scan lines and a plurality of signal lines mutually intersecting and an opposing substrate located on an opposite side of a liquid crystal layer from the array substrate. At intersections between the scan lines and the signal lines are provided respective pixels of red, blue, and green, each having a reflecting section having an external-light reflecting unit and a phase difference film. In the liquid crystal display, when phase difference values of the phase difference films in the respective red, blue, and green pixels are represented by rR, rG, and rB, respectively, at least one of expressions: rR>rG; rG>rB and rR>rB holds true, as well as expressions: 120 nm<rR<180 nm; 110 nm<rG<170 nm; and 80 nm<rB<140 nm hold true (See JP-A-2006-292847).

In the liquid crystal display above, the phase difference values of the pixels are defined by considering optical characteristics of the respective red, blue, and green pixels, thereby preventing contrast ratio reduction and reducing coloring upon reflective display.

In addition, there is known another liquid crystal display including a liquid crystal layer and a first and a second substrate sandwiching the liquid crystal layer therebetween. A single pixel has a reflective display section and a transmissive display section therein. In the reflective display section, the liquid crystal layer has a retardation of ¼ wavelength and a phase difference plate has a retardation of ½ wavelength (See JP-A-2005-338256).

The liquid crystal display described above as the other example is a so-called semi-transmissive in-plane switching (IPS) mode LCD. With the optical design as above, the display is proposed to realize a wide viewing angle equivalent to that of a transmissive IPS mode LCD.

In the liquid crystal displays disclosed, the phase difference film or the phase difference plate is disposed at a side facing the liquid crystal layer. JP-A-2006-292847 discloses an example of a method for forming such a built-in-type phase difference film. In the method, a mixture of a liquid crystalline high polymer and a photosensitive resin is applied on a substrate to perform patterning by photo-etching.

In the method for forming the phase difference film described above, however, patterning by photo-etching is likely to vary a film thickness at an outer periphery of the phase difference film. Thereby, a phase difference value changes with the varied film thickness, which can result in contrast reduction due to light leakage in actual display.

In addition, the phase difference film needs to be patterned in accordance with the red, blue, and green pixels, which complicates a production process of the display.

Furthermore, the patterning by photo-etching leads to wasted use of most of a material for the phase difference film.

SUMMARY

The present invention has been accomplished to solve at least a part of the above problems and is realized in various aspects as below. An advantage of the present invention is to provide a liquid crystal device and a method for producing the liquid crystal device, which can exhibit high contrast in both of reflective and transmissive modes, thereby providing excellent image quality. Another advantage of the invention is to provide an electronic apparatus incorporating the liquid crystal device.

A liquid crystal device according to a first aspect of the invention includes a pair of substrates; a liquid crystal layer sandwiched between the pair of substrates; a plurality of pixels each including a plurality of pixel regions, each of the pixel regions having a reflective display region and a transmissive display region; a phase difference film provided in the reflective display region, the phase difference film being located at a side of one substrate of the pair of substrates adjacent to the liquid crystal layer; and a partition wall member having light-shielding properties, the partition wall member being provided on a surface of the one substrate adjacent to the liquid crystal layer to partition the phase difference film.

In the above structure, the phase difference film is partitioned by the light-shielding partition wall member. This can suppress a change in film thicknesses at an outer periphery of the phase difference film, thereby reducing light leakage caused by a change of a phase difference value at the outer periphery thereof. Additionally, the structure can prevent the light leakage from being induced in the transmissive display region. Thus, there can be provided a liquid crystal device that achieves a predetermined contrast level in both the reflective and the transmissive display modes, thereby realizing excellent image quality.

Preferably, the liquid crystal device of the first aspect further includes a color filter that includes a plurality of different color filter elements and that is provided at the side of the one substrate adjacent to the liquid crystal layer; and in which the partition wall member partitions the different color filter elements into each color filter element, as well as partitions the phase difference film.

In this structure, the partition wall member partitions both the filter elements and the phase difference film together. Thus, the liquid crystal device allows color display and can provide excellent image quality in a simplified structure.

In the liquid crystal device above, preferably, each of the filter elements provided in the reflective display region of the one substrate is laminated on a surface of the phase difference film adjacent to the liquid crystal layer.

It is desirable for a liquid crystal device to have a structure preventing various kinds of functional layers adjacent to a liquid crystal layer from diffusing impurities into the liquid crystal layer. In the above preferably structure, the each filter element provided in the reflective display region can protect the phase difference film. Thus, allowing the filter elements to serve as protecting layers can prevent diffusion of any impurity from the phase difference film. This widens a range of material options for the phase difference film.

Preferably, the liquid crystal device of the first aspect further includes an alignment film provided at the side of the one substrate adjacent to the liquid crystal layer to define a direction of a slow axis of the phase difference film.

In the above structure, the alignment film defines the direction of the slow axis of the phase difference film, so that the phase difference film hardly causes disturbances of a slow phase. Additionally, defining the slow axis direction of the phase different film by using the alignment film enables selection of various materials for the phase difference film, such as thermally curable or photocurable materials.

In the above liquid crystal device, preferably, a film thickness of the phase difference film provided corresponding to at least one color filter element of the color filter elements included in each pixel region of the pixels is different from a film thickness of the phase difference film provided corresponding to at least another color filter element of the color filter elements.

In the above structure, the phase difference film can obtain a most appropriate thickness in accordance with an absorption wavelength of each color filter element. Thus, the liquid crystal device can provide better visual images.

Preferably, the liquid crystal device of the first aspect further includes a liquid-crystal-layer-thickness adjusting layer provided between the phase difference film and the liquid crystal layer in the reflective display region partitioned by the partition wall member to adjust a thickness of the liquid droplet layer in the reflective display region.

In the above structure, providing the liquid-crystal-layer-thickness adjusting layer can maintain a predetermined thickness of the liquid crystal layer in the reflective display region, even when a film thickness for obtaining a predetermined phase difference value varies among materials of the phase difference film, or even when the film thickness of the phase difference film varies among colors of the filter elements.

In the liquid crystal device of the first aspect, preferably, the liquid-crystal-layer-thickness adjusting layer is provided such that the thickness of the liquid crystal layer in the reflective display region is half a thickness of the liquid crystal layer in the transmissive display region.

The above structure allows the phase difference film to compensate a phase difference between transmitted light in the transmissive display region and reflected light having an optical path length twice that of the transmitted light in the reflective display region so as to equalize phases of both light rays. This can eliminate a phase shift between the transmitted light and the reflected light, thereby enabling production of a liquid crystal device capable of realizing excellent image quality.

A method for producing a liquid crystal device according to a second aspect of the invention includes forming a partition wall member having light-shielding properties on a surface of one substrate of a pair of substrates to partition each of a plurality of pixels into a plurality of pixel regions, each of the pixel regions having a reflective display region and a transmissive display region, as well as to partition the reflective display region from the transmissive display region; forming a phase difference film in the reflective display region partitioned by the partition wall member; and constructing by bonding together the pair of substrates via a liquid crystal layer sandwiched between the substrates.

In the above method, when forming the phase difference film, the phase difference film can be formed in the reflective display region such that an outer periphery of the phase difference film is partitioned by the partition wall member. This can suppress a change in film thickness at the outer periphery of the phase difference film, thereby reducing light leakage caused by the change of a phase difference value at the outer periphery of the film. Additionally, the method can prevent the light leakage from being induced in the transmissive display region. Thus, there can be obtained a liquid crystal device capable of achieving a predetermined contrast level in both the reflective and the transmissive display modes and thus delivering excellent image quality.

Preferably, the method according to the second aspect further includes forming a color filter including a plurality of different color filter elements, each of the color filter elements being provided in each of the pixel regions partitioned by the partition wall member; and in which forming the partition wall member includes forming the partition wall member such that a height of the partition wall member is greater than thicknesses of the filter elements, and forming the phase difference film includes forming the phase difference film such that the phase difference film is laminated on the filter element in the reflective display region partitioned by the partition wall member.

In the above method, the partition wall member is formed so as to partition both the filter element and the phase difference film together. Accordingly, as compared to forming the partition wall member separately for the filter element and the phase difference film, the method can provide a simplified production process.

Preferably, the method according to the second aspect further includes forming a color filter including a plurality of different color filter elements, each of the color filter elements being provided in each of the pixel regions; and in which forming the partition wall member includes forming the partition wall member such that a height of the partition wall member is greater than a thickness of the phase difference film, and forming the color filter includes forming the filter elements such that each of the filter elements is laminated on the phase difference film in the reflective display region partitioned by the partition wall member.

In the above method, each filter element is laminated on the phase difference film in the reflective display region. Thereby, the filter element can be used as a protective layer of the phase difference film.

Preferably, in the above method, forming the color filter includes forming the filter elements by applying a droplet of a liquid containing a material of each filter element in each pixel region partitioned by the partition wall member and then solidifying the liquid applied.

In the above method, the filter elements are formed using a liquid droplet discharging method. Accordingly, unlike photolithography, any mask or the like is not required and the material of the filter element is not wasted, thereby enabling the filter elements to be efficiently formed.

Preferably, the method according to the second aspect further includes forming an alignment film that defines a direction of a slow axis of the phase difference film before forming the phase difference film.

In the above method, when forming the alignment film, the film is formed to define the direction of the slow axis of the phase difference film, thereby allowing the phase difference film to hardly cause disturbances of a slow phase. In addition, defining the slow-axis direction of the phase difference film by using the alignment film allows selection of various materials for the phase difference film.

Preferably, in the above method, forming the alignment film includes forming the alignment film by applying a droplet of a liquid containing a photosensitive material of the alignment film in the reflective display region partitioned by the partition wall member, then drying the liquid applied, and curing the liquid by light irradiation.

In the above method, using the liquid droplet discharging method, the alignment film can be selectively formed only in the reflective display region. This can prevent wasteful use of the material of the alignment film, as compared to forming the alignment film, which defines the slow-axis direction of the phase difference film, throughout the pixel regions.

Preferably, in the above method, forming the phase difference film includes applying a droplet of a liquid containing a material of the phase difference film in the reflective display region partitioned by the partition wall member and depositing a film by solidifying the liquid applied so as to obtain the phase difference film.

In the above method, using the liquid droplet discharging method, the phase difference film can be selectively formed only in the reflective display region. Accordingly, as compared to patterning by applying the material of the phase difference film on an entire surface of the one substrate of the pair of substrates, the method can simplify the production process and also can prevent wasteful use of the material of the phase difference film.

Preferably, in the above method, upon application of the liquid containing the material of the phase difference film, an amount of the liquid applied corresponding to at least one display color in the reflective display region is different from an amount of the liquid applied corresponding to at least another display color.

The above method allows a thickness of the phase difference film formed corresponding to at least one display color to be different from a thickness of the phase difference film formed corresponding to at least another display color. Accordingly, the phase difference film can be formed to have a most appropriate thickness in accordance with a wavelength of each display color. Consequently, there can be produced a liquid crystal device capable of realizing better visual images.

Preferably, the method according to the second aspect further includes forming a liquid-crystal-layer-thickness adjusting layer in the reflective display region partitioned by the partition wall member to adjust a thickness of the liquid crystal layer in the reflective display region.

The above method further includes forming the liquid-crystal-layer-thickness adjusting layer. The liquid-crystal-layer-thickness adjusting layer can serve to maintain a predetermined thickness of the liquid crystal layer in the reflective display region, even when there a film thickness for obtaining a predetermined phase difference value varies among materials of the phase difference film or even when the film thickness of the phase difference film varies among display colors.

Preferably, in the above method, forming the liquid-crystal-layer-thickness adjusting layer includes forming the liquid-crystal-layer-thickness adjusting layer such that the thickness of the liquid crystal layer in the reflective display region is half a thickness of the liquid crystal layer in the transmissive display region.

The above method can compensate a phase difference between transmitted light in the transmissive display region and reflected light having an optical path length twice that of the transmitted light in the reflective display region, so as to equalize phases of both light rays. This can eliminate a phase shift between the transmitted light and the reflected light, thereby enabling production of a liquid crystal device capable of realizing excellent image quality.

Preferably, in the above method, forming the liquid-crystal-layer-thickness adjusting layer includes forming the liquid-crystal-layer-thickness adjusting layer by applying a droplet of a liquid containing a material of the liquid-crystal-layer-thickness adjusting layer in the reflective display region partitioned by the partition wall member and solidifying the liquid applied.

In the above method, using the liquid droplet discharging method, the liquid-crystal-layer-thickness adjusting layer can be selectively formed only in the reflective display region. Accordingly, as compared to patterning by applying the material of the liquid-crystal-layer-thickness adjusting layer on an entire surface of the one substrate of the pair of substrates, the method can simplify the production process and also can prevent wasteful use of the material of the liquid-crystal-layer-thickness adjusting layer.

An electronic apparatus according to a third aspect of the invention includes the liquid crystal device according to the first aspect or a liquid crystal device produced by the method according to the second aspect.

The electronic apparatus of the third aspect incorporates the liquid crystal device that can realize excellent visual quality and is obtained by the simplified production process. Therefore, the electronic apparatus has competitively advantageous features.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to drawings.

First Embodiment

Liquid Crystal Device

Figure 1:
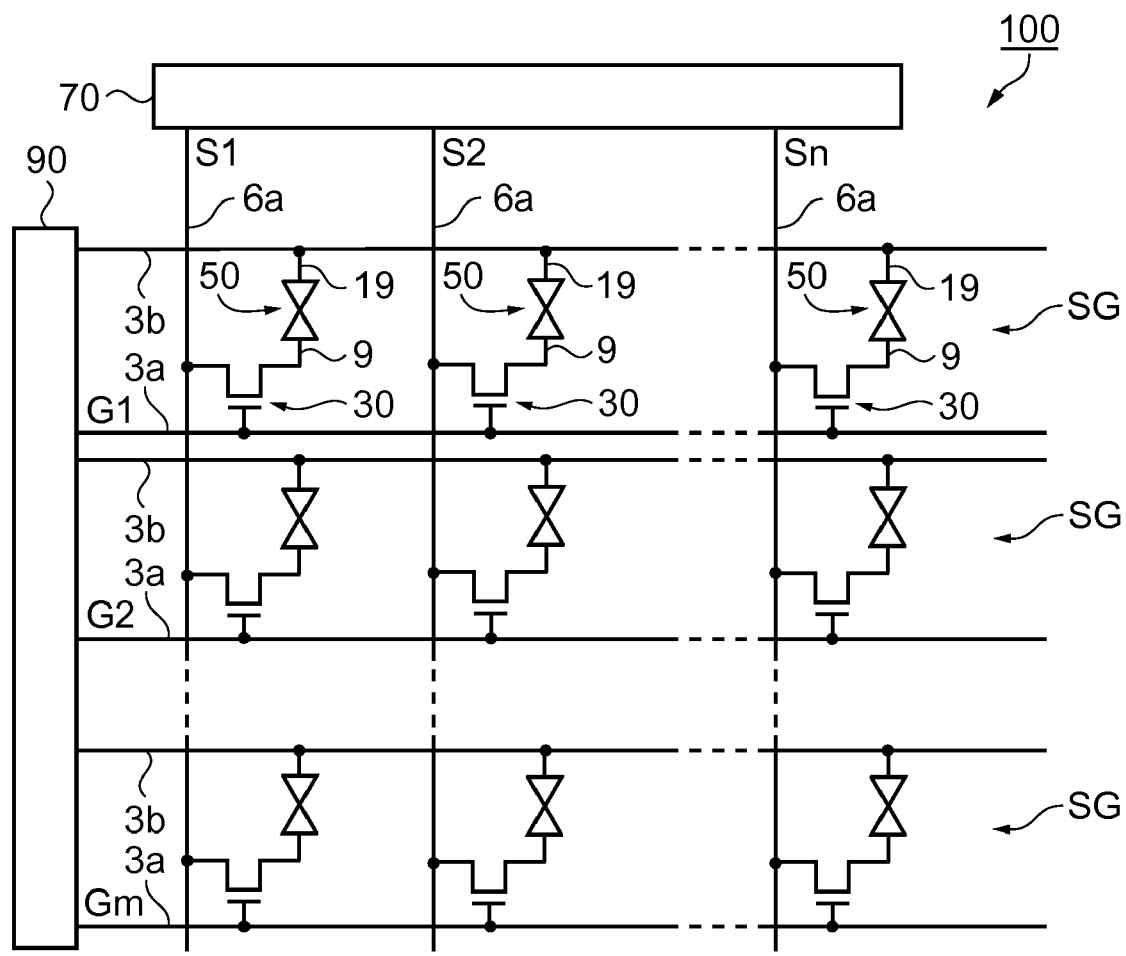
FIG. 1 is an equivalent circuit diagram showing an electrical configuration of a liquid crystal device according to a first embodiment of the invention.

First will be described a liquid crystal device according to a first embodiment of the invention. FIG. 1 is an equivalent circuit diagram showing an electrical configuration of the liquid crystal device.

As shown in FIG. 1, a liquid crystal device 100 of the embodiment includes a plurality of sub pixels SG. Each of the sub pixels SG includes a pixel electrode 9, a common electrode 19, and a thin film transistor (TFT) 30 that switchingly controls the pixel electrode 9. Between the pixel electrode 9 and the common electrode 19 of the each sub pixel SG is interposed a liquid crystal layer 50. Each common electrode 19 is electrically connected to each of common lines 3b extended from a scan-line driving circuit 90 so as to be maintained at an electric potential common to the each sub pixel SG.

Each of a plurality of data lines 6a is extended from a data-line driving circuit 70 to be electrically connected to a source of the TFT 30. The data-line driving circuit 70 supplies image signals S1 to Sn to the each sub pixel SG via the each data line 6a. The image signals S1 to Sn may be supplied in this numerical order in a line-by-line sequence, or may be supplied to each group of mutually adjacent ones of the data lines 6a.

A gate of each TFT 30 is electrically connected to each scan line 3a extended from the scan-line driving circuit 90. The scan-line driving circuit 90 supplies respective pulses of the scan signals G1 to Gm to the each scan line 3a at a predetermined timing, whereby the signals G1 to Gm are applied to the gate of the each TFT 30 in this numerical order in a line-by-line sequence at a predetermined timing. The pixel electrode 9 is electrically connected to a drain of the TFT 30.

Each of the scan signals G1 to Gm is input to the each TFT 30 as a switching element to turn on the transistor. The TFT 30 is maintained in an on-state for a predetermined time to allow each of the image signals S1 to Sn supplied from the data lines 6a to be written in the each pixel electrode 9 at a predetermined timing. Each of the image signals S1 to Sn of a predetermined level is written into liquid crystal via the pixel electrode 9 to be retained for a predetermined time between the pixel electrode 9 and the common electrode 19 opposing the pixel electrode 9 via the liquid crystal.

Figure 2:
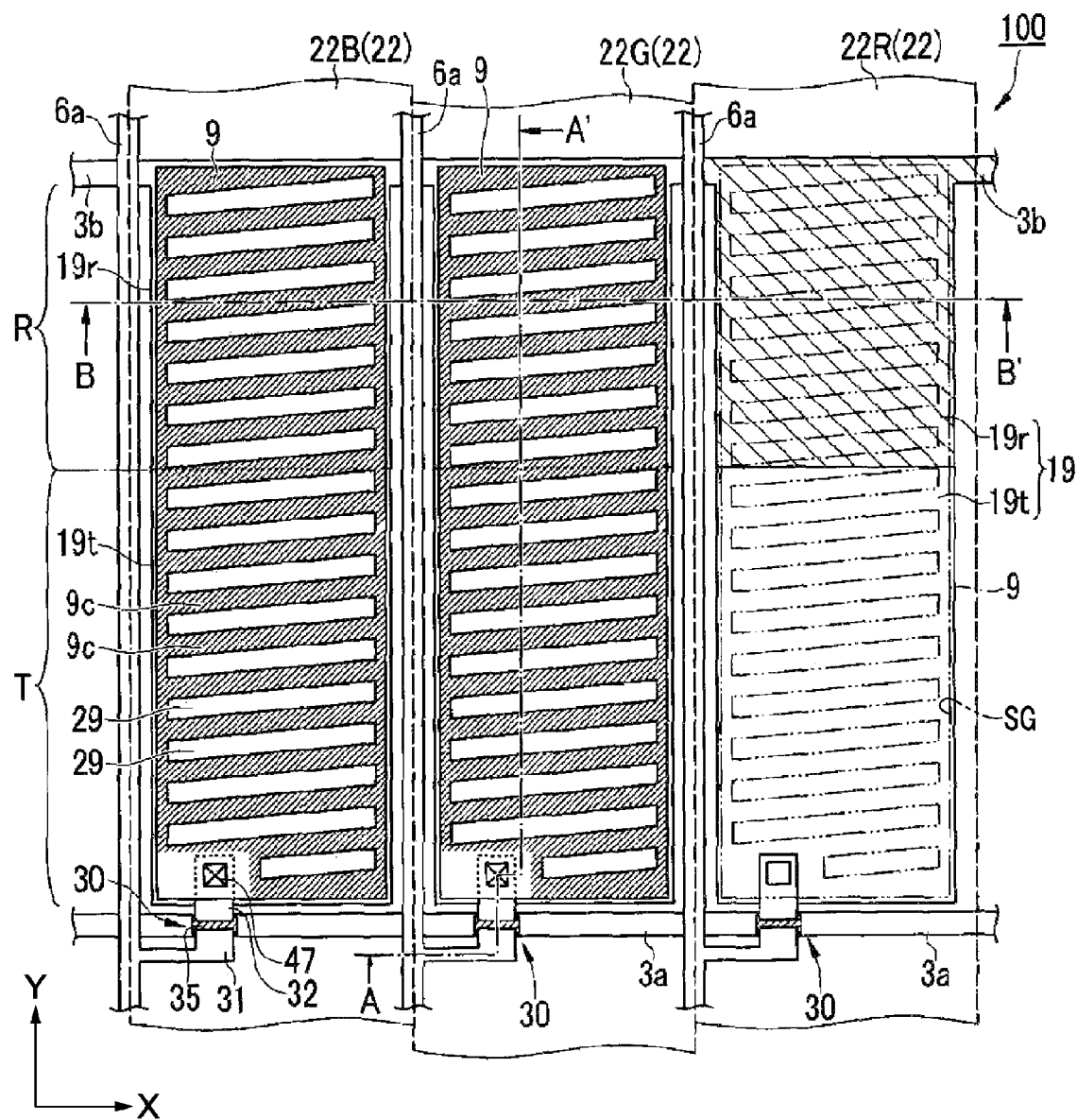
FIG. 2 is a schematic plan view showing a structure of a pixel

FIG. 2 is a schematic plan view showing a structure of a pixel. In the drawing, the liquid crystal device 100 includes a plurality of pixels each composed of three sub pixels SG corresponding to three different color filter elements 22R (red), 22G (green), and 22B (blue). In each of the sub pixels SG, the pixel electrode 9 is rectangular-shaped and has a plurality of slits (gaps) 29 that form a roughly ladder-like shape. Additionally, at an outer periphery of the pixel electrode 9 are arranged the scan line 3a, the common line 3b, and the data line 6a so as to surround the pixel electrode 9.

The TFT 30 is formed near an intersection between the scan line 3a and the data line 6a to be electrically connected to the data line 6a and the pixel electrode 9. In addition, the common electrode 19 having a rectangular shape is provided in a position approximately overlapping with the pixel electrode 9 in a two-dimensional view.

The pixel electrode 9 is a conductive film made of a transparent conductive material such as indium tin oxide (ITO). The pixel electrode 9 of a single sub pixel SG has 17 slits 29 formed therein. The slits 29 are extended in a direction intersecting with both the scan line 3a and the data line 6a (in an oblique direction in FIG. 2) to be formed so as to be arranged at equal distances from each other in a Y-axis direction. The slits 29 have approximately an equal width and are parallel to each other. Consequently, the pixel electrode 9 has a plurality of (16 in FIG. 2) band-shaped electrodes 9c. Since the slits 29 with the equal width are positioned at mutually equal distances, the band-shaped electrodes 9c are also equal in width and positioned at equal distances from each other. In the present embodiment, the widths of the slit 29 and the band-shaped electrode 9c are both 4 μm.

The common electrode 19 includes a transparent common electrode 19t and a reflective common electrode 19r. The transparent common electrode 19t has an approximately rectangular shape in a two-dimensional view and is made of a transparent conductive material such as ITO. The reflective common electrode 19r is approximately rectangular in a two-dimensional view and made of a metal having light reflectivity, such as aluminum or silver. The common electrodes 19t and 19r are electrically connected to each other at side ends of the electrodes.

The reflective common electrode 19r is integrally formed with the common line 3b extended in parallel to the scan line 3a. Thus, the common electrode 19 including the transparent common electrode 19t and the reflective common electrode 19r is electrically connected to the common line 3b.

A region having the reflective common electrode 19r formed therein constitutes a reflective display region R of the sub pixel SG, whereas a region having the transparent common electrode 19t constitutes a transmissive display region T. That is, in the liquid crystal device 100, the reflective common electrode 19r serves as a reflecting layer, and the each sub pixel SG has the reflective common electrode 19r and the transparent common electrode 19t formed therein.

Alternatively, the common line 3b and the reflective common electrode 19r may be formed by using separate conductive films to be electrically connected to each other. To do that, for example, the reflective common electrode 19r and the common line 3b may be formed on different wiring layers located via an interlayer insulating film and then the electrode 19r and the line 3b may be connected to each other by a contact hole formed in the interlayer insulating film. Additionally, the transparent common electrode 19t may be formed so as to cover the reflective common electrode 19r.

The TFT 30 includes a semiconductor layer 35 made of an island-shaped amorphous silicon film and partially formed in a position above the scan line 3a; a source electrode 31 branched from the data line 6a to be extended on a surface of the semiconductor layer 35; and a rectangular drain electrode 32 extended from the surface of the semiconductor layer 35 to a region where the pixel electrode 9 is formed.

The scan line 3a serves as a gate electrode of the TFT 30 at a position opposing the semiconductor layer 35. The drain electrode 32 is electrically connected to the pixel electrode 9 by a pixel contact hole 47 formed at a position where the drain electrode 32 and the pixel electrode 9 two-dimensionally overlap with each other.

In the each sub pixel SG shown in FIG. 2, a region where the pixel electrode 9 two-dimensionally overlaps with the common electrode 19 serves as a capacitance of the sub pixel SG. Accordingly, no additional retention capacitance is needed to retain an image signal in the sub pixel region, thus obtaining a high aperture ratio.

Figure 3A:
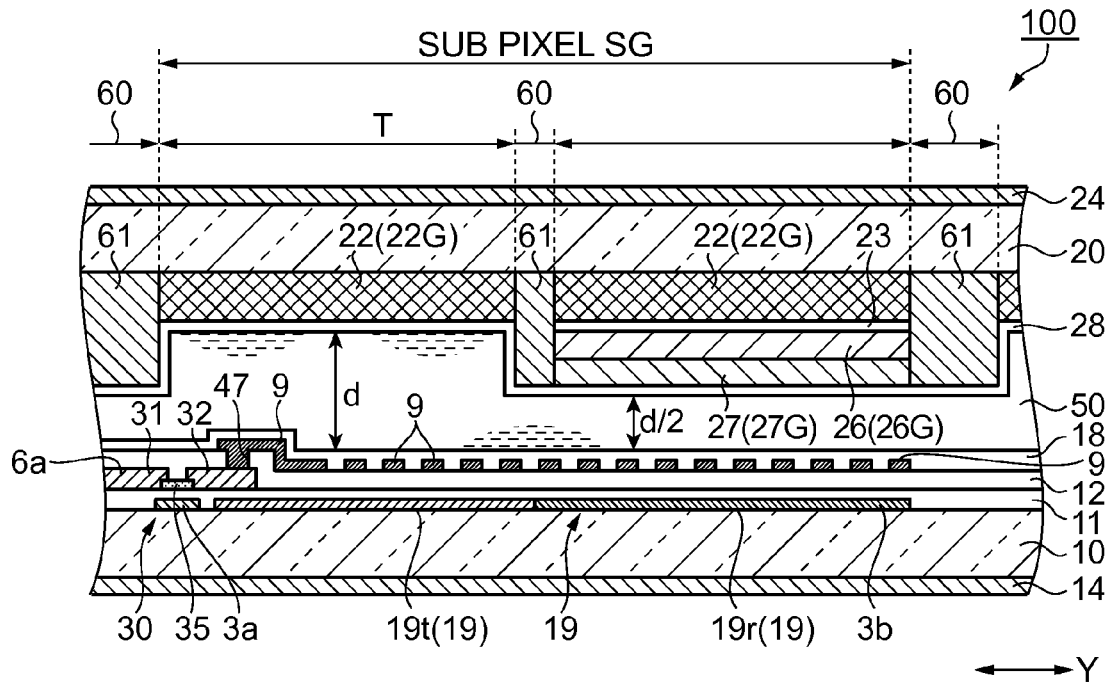
FIG. 3A is a sectional view showing a structure of the liquid crystal device taken along line A-A' of FIG. 2.
Figure 3B:
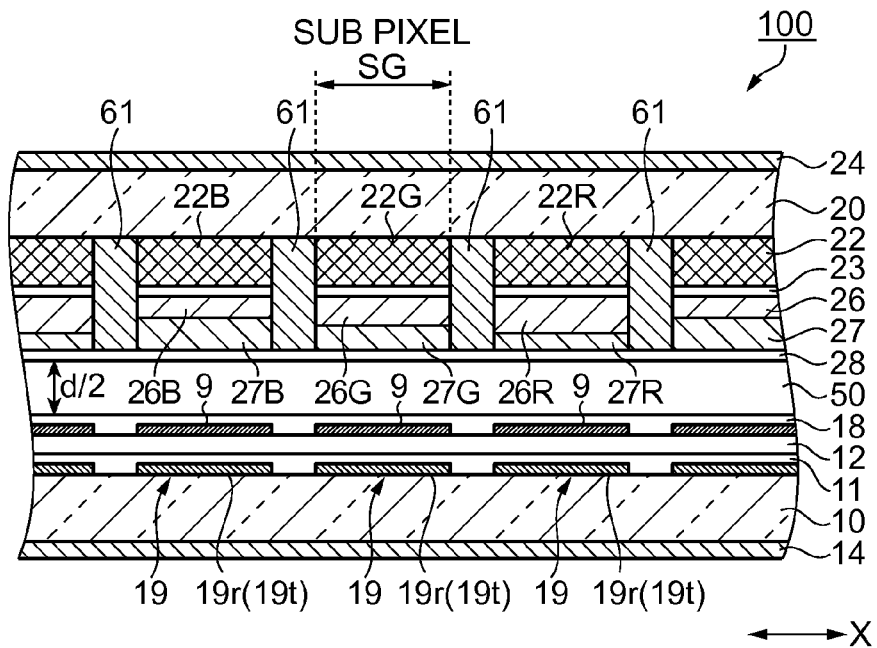
FIG. 3B is a sectional view showing a structure of the liquid crystal device taken along line B-B' of FIG. 2.

With reference to FIGS. 3A and 3B, the structure of the liquid crystal device 100 will be described in more detail. FIG. 3A schematically shows a sectional view of the structure of the liquid crystal device. Specifically, FIG. 3A is a sectional view taken along line A-A'' of FIG. 2, and FIG. 3B is a sectional view taken along line B-B' of the same.

As shown in FIG. 3A, the liquid crystal device 100 includes a pair of substrates, namely an opposing substrate 20 and an element substrate 10. The element substrate 10 has a first and a second surface, in which the pixel electrodes 9 are formed at a side adjacent to the first surface thereof and the common electrodes 19 are provided on the first surface thereof. The liquid crystal layer 50 is sandwiched between the opposing substrate 20 and the element substrate 10 having the electrodes 9 and 19. The opposing substrate 20 includes a color filter 22 and a partition wall member 61 that partitions the color filter 22 (a filter element 22G) into each of the sub pixels SG (each color). Above the color filter 22 (at a side of the color filter adjacent to the liquid crystal layer 60) are selectively formed a phase difference film 26 (26G) and a cell-thickness adjusting layer 27 (27G) corresponding to the reflective display region R. The partition wall member 61 is formed also to partition the phase difference film 26 and the cell-thickness adjusting layer 27 together. Accordingly, a cell thickness d of the reflective display region R is smaller than that of the transmissive display region T (a thickness of the liquid crystal layer 50), and is approximately d/2, namely, half the cell thickness d of the region T in the present embodiment.

In the liquid crystal device 100 performing reflective display as above, in terms of optical design, upon reflective black display, external light reaching the reflective common electrodes 19r needs to be roughly-circularly polarized light over a whole visible wavelength range. The reason for this is that when external light reaching the reflective common electrodes 19r is elliptically polarized light, coloring occurs in black display, which makes it difficult to obtain high-contrast reflective display.

Thus, in the embodiment, the phase difference film 26 and the cell-thickness adjusting layer 27 are formed selectively in the reflective display region R partitioned by the partition wall member 61 so as to allow the cell thickness of the reflective display region R to be smaller than that of the transmissive display region T. This enables broadband circularly polarized light to be produced by an upper polarizing plate 24, the phase difference film 26, and the liquid crystal layer 50 inside the reflective display region R, whereby external light reaching the reflective common electrodes 19 is approximated to circularly polarized light in a whole visible wavelength range.

On the first surface of the element substrate 10 made of transparent glass or the like are provided the scan lines 3a, the common electrodes 19, and the common lines 3b. In addition, an insulating thin film 11 made of a silicon oxide film or the like is formed to cover the scan lines 3a, the common electrodes 19, and the common lines 3b. On the insulating thin film 11 are formed the island-shaped semiconductor layer 35, the source electrode 31 (the data line 6a), and the drain electrode 32, where the respective electrodes 31 and 32 partially overlap with the semiconductor layer 35, thereby forming each TFT 30. Then, the semiconductor layer 35, the source electrode 31, and the drain electrode 32 are covered by an interlayer insulating film 12 made of a silicon oxide or resin film. On the interlayer insulating film 12 is formed the pixel electrode 9. The pixel electrode 9 is electrically connected to the drain electrode 32 via the pixel contact hole 47 reaching the drain electrode 32 after penetrating through the interlayer insulating film 12. A boundary between the transparent common electrode 19t and the reflective common electrode 19r of the common electrode 19 is located immediately under the partition wall 61 that partitions the transmissive display region T and the reflective display region R from each other.

An alignment film 18 made of polyimide or the like is formed to cover the pixel electrodes 9. The alignment film 18 is subjected to an alignment treatment such as rubbing to align liquid crystal molecules in a predetermined direction. In the embodiment, an alignment direction controlled by the alignment film 18 is parallel to an extending direction of the scan lines 3a and intersects with an extending direction of the slits 29 of the pixel electrodes 9.

Like the element substrate 10, the opposing substrate 20 is made of transparent glass or the like and has a first and a second surface. On the first surface of the opposing substrate 20 are formed the color filter 22 (the filter element 22G), an alignment film 23, the phase difference film 26 (26G), the cell-thickness adjusting layer 27 (27G), the partition wall member 61 that partitions those respective constituent elements, and an alignment film 28, which are located sequentially in a direction orienting toward the liquid crystal layer 50. In addition, the upper polarizing plate 24 is attached onto the second surface of the opposing substrate 20 (a surface of the substrate 20 opposite from the location of the liquid crystal layer 60). Optical layouts of the upper polarizing plate 24 and a lower polarizing plate 14 attached onto the second surface of the element substrate 10 (a surface of the element substrate 10 opposite from a location of the liquid crystal layer 50 are arranged in a crossed Nicol relation.

The partition wall member 61 is referred to as a black matrix (BM). To form the partition wall member 61, for example, a resinous material containing a black pigment or the like as a light-shielding material may be applied on the first surface of the opposing substrate 20 by printing such as offset printing to perform patterning. Furthermore, when selecting a photosensitive material as the above resinous material, the resinous material can be patterned by photolithography after applied entirely on the first surface of the substrate 20. In the present embodiment, a height of the partition wall member 61 is adjusted so as to partition the color filter 22 (the filter element 22G), the alignment film 23, the phase difference film 26 (26G), and the cell-thickness adjusting layer 27 (27G) together. Accordingly, the partition wall member 61 may be formed by laminating the material a plurality of times so as to be formed into a thick film. Additionally, preferably, a Y-direction length (namely, a width) of the partition wall member 61 partitioning the transmissive display region T from the reflective display region R is determined in consideration of a positional accuracy in the Y-axis direction upon bonding of the element substrate 10 with the opposing substrate 20 so as to allow the boundary between each of the transparent common electrodes 19t and each of the reflective common electrodes 19r to be positioned immediately under the partition wall member 61.

The color filter 22 is formed by filling a resinous material containing each color filter element forming material (a coloring material) in each of openings partitioned by the partition wall member 61. As a method for forming the color filter 22, a liquid droplet discharging method (an inkjet method) is used to apply each liquid that contains the above resinous material, and then the liquid applied is dried. Using the liquid droplet discharging method enables a necessary amount of the liquid to be more unwastefully applied in the each sub pixel region partitioned by the partition wall member 61 than using photolithography. In addition, no photo mask is needed, thus enabling omission of production process steps such as exposure and development.

The phase difference film 26 is formed above the color filter 22, selectively corresponding to the reflective display region R. The phase difference film 26 provides a phase difference (retardation) of an approximately ½ wavelength ($\lambda/2$) to light transmitting through the phase difference film 26, and is a so-called a built-in phase difference film provided on an inner side of a cell including the liquid crystal layer 50 sandwiched between the pair of substrates.

To form the phase difference film 26, for example, using a liquid droplet discharging method (an inkjet method), a liquid (an organic solution) containing a polymerizable liquid crystal compound as a material of the phase difference film 26 is applied on the alignment film 23 formed in the reflective display region R partitioned by the partition wall 61 and then solidified in a state where liquid crystal molecules are aligned in a predetermined direction. Details of formation of the phase difference film 26 will be given later in the description of a method for producing the liquid crystal device.

The alignment film 23 controls an alignment direction of the polymerizable liquid crystal compound (a direction of a slow axis of the phase difference film 26) and can be formed using the same film material as that of the alignment films 18 and 28 facing the liquid crystal layer 50. In this case, the alignment film 23 is subjected to surface treatment such as rubbing to determine the alignment direction (the direction of slow axis-alignment). In addition, other than on the alignment film 23, for example, on the color filter 22, a silicon oxide layer or the like may be diagonally evaporated, or a photosensitive alignment film material; may be applied and then irradiated by polarized UV light to cause photo-alignment. In the embodiment, preferably, the alignment film 23 is selectively formed in the region partitioned by the partition wall member 61. Thus, like the method for forming the phase difference film 26, a liquid containing a photo-sensitive alignment film material is applied by the liquid droplet discharging method.

A value of a phase difference (hereinafter referred to as phase difference value) given to light transmitting through the phase difference film 26 can be adjusted by the kind of the polymerizable liquid crystal compound as the material of the phase difference film 26 and a layer thickness of the phase difference film 26. In the embodiment, a desired phase difference value of the phase difference film 26 is equal to a phase difference value (λ/2) of the liquid crystal layer 50 in the transmissive display region T. A reference wavelength λ is 550 nm, and the phase difference value of the liquid crystal layer 50 is obtained by multiplying a birefringence index Δn of liquid crystal molecules by the cell thickness d, thus resulting in λ/4.

As shown in FIG. 3B, the phase difference film 26 and the cell-thickness adjusting layer 27 are provided in the reflective display region R partitioned by the partition wall member 61 in each sub pixel SG corresponding to each of the three colors (R, G, and B) of the color filter 22.

In the color filter 22, the respective color filter elements 22R, 22G, and 22B have an approximately equal film thickness, whereas the phase difference film 26 formed in the respective color filter elements 22R, 22G, and 22B has a different thickness among the color filter elements, in the embodiment. Specifically, a phase different film 26R is larger than a phase different film 26G, which is in turn larger than a phase different film 22B. In this case, the thickness of the phase difference film 26 is varied among the colors in consideration of absorption wavelengths of the respective color filter elements 22R, 22G, and 22B so as to provide a most appropriate phase difference value. This can improve color purity in color display.

Accordingly, in order to set the cell thickness in the reflective display region R to d/2 as described above, the thickness of the cell-thickness adjusting layer 27 needs to be varied among the colors. Specifically, a cell-thickness adjusting layer 27B is larger than a cell-thickness adjusting layer 27G, which is in turn larger than a cell-thickness adjusting layer 27R. The thicknesses of the phase difference film 26 and the cell-thickness adjusting layer 27 may be adjusted corresponding to at least one color (one display color) filter element to provide sufficient advantageous effects.

Preferably, the cell-thickness adjusting layer 27 is made of a resin having optical transmittance and isotropy, and also desirably has a physical strength as a protective layer covering the phase difference layer 26. For example, an acryl resin may be suitable. In the embodiment, the cell-thickness adjusting layer 27 is selectively formed in the region partitioned by the partition wall member 61. Thus, the liquid droplet discharging method is also preferably used. In that case, the discharging method uses a liquid containing the above resin mentioned as the material of the cell-thickness adjusting layer.

Figure 4:
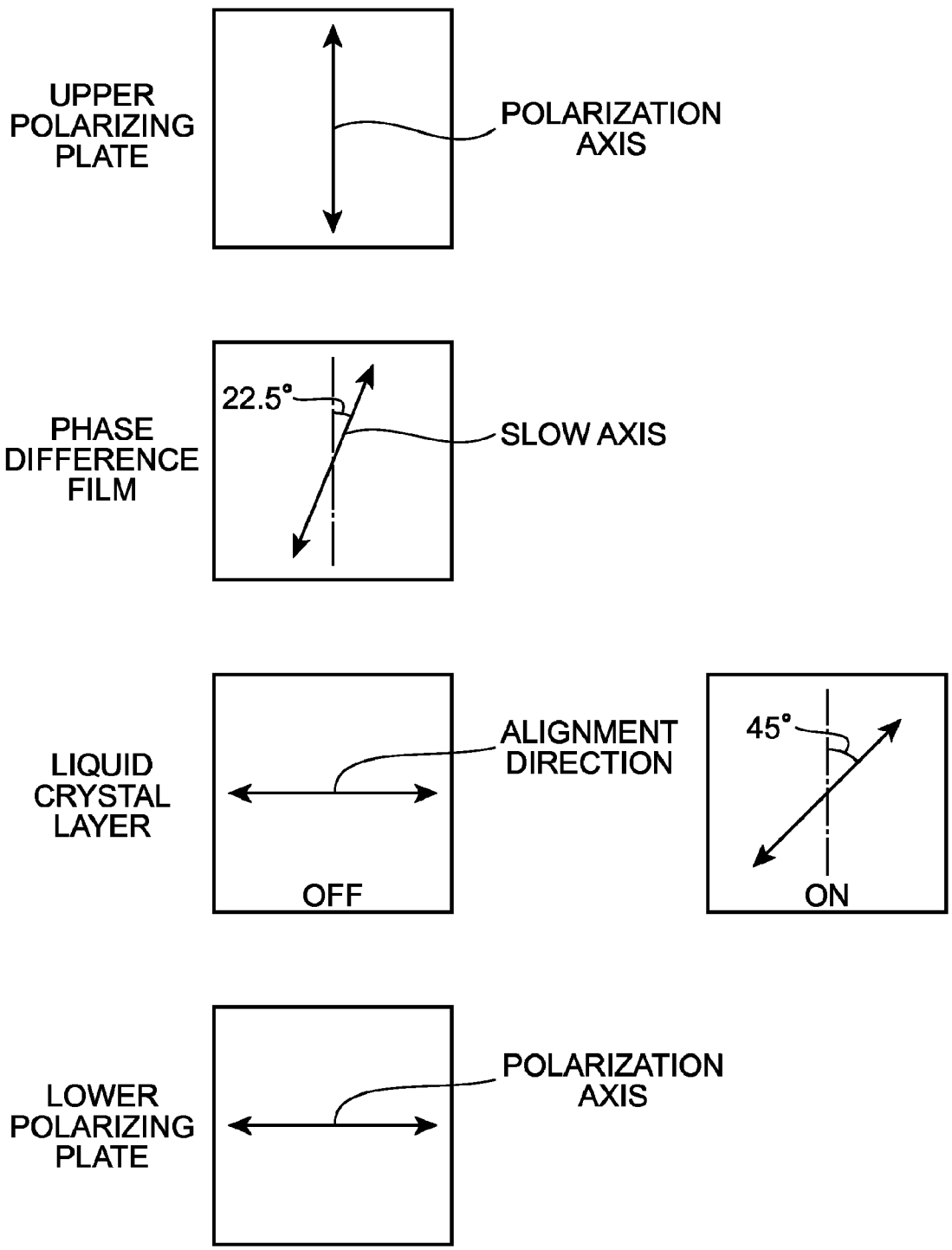
FIG. 4 is a schematic diagram showing an example of optical design conditions of the liquid crystal device.

Next will be summarized optical design conditions of the liquid crystal device 100. FIG. 4 schematically shows an example of the optical design conditions of the liquid crystal device 100. As shown in the drawing, under the optical design conditions of the liquid crystal device 100, a polarization axis of the upper polarizing plate 24 is orthogonal to a polarization axis of the lower polarizing plate 14. The slow axis of the phase difference film 26 formed in the reflective display region T intersects with the polarization axis of the upper polarizing plate 24 at an angle of 22.5 degrees. The slow axis thereof is set so as to intersect with the slits 29 (See FIG. 2) formed in the pixel electrode 9 at an angle of 45 degrees. A direction of slow-axis alignment of liquid crystal molecules in the liquid crystal layer 50 (the first and the second liquid crystal layers 50a and 50b) is parallel to the polarization axis of the lower polarizing plate 14 in an off-state where no predetermined driving voltage is applied between the pixel electrode 9 and the common electrode 19. In contrast, in an on-state where a predetermined driving voltage is applied between the electrodes 9 and 19, the direction of the slow-axis alignment of the liquid crystal molecules intersects with the polarization axis of the upper polarizing plate 24 at 45 degrees. Thereby, in the off-state, transmitted light that is polarized after transmitting through the lower polarizing plate 14, namely, linearly polarized light is given a phase of λ/2 by the liquid crystal layer 50, whereby an oscillating direction of the transmitted light is shifted to a direction orthogonal to the polarization axis of the polarizing plate 24. That is, the oscillating direction of the transmitted light is turned parallel to an absorption axis of the plate, thereby shielding the light. Meanwhile, incident light polarized after transmitting through the upper polarizing plate 24 (linearly polarized light) in the reflective display region R is given respective phases of λ/2 and λ/4 by the phase difference film 26 and the liquid crystal layer 50, respectively, and thereby turned to be approximately circularly polarized light in an approximately whole visible wavelength range to be input to the reflective common electrode 19r. The light reflected by the reflective common electrode 19r is converted into polarized light perpendicular to the polarization axis of the upper polarizing plate 24 upon re-incidence to the upper polarizing plate 24. Accordingly, the light is not transmitted through the upper polarizing plate 24, resulting in a so-called black display state (a normally black state). In the on-state, the direction of slow-axis alignment of the liquid crystal molecules is at 45 degrees with respect to the polarization axes of the upper and the lower polarizing plates 24 and 14. Thus, the oscillating directions of transmitted light and reflected light transmitting through the color filter 22 become parallel to the polarization axis of the upper polarizing plate 24, thereby transmitting through the upper polarizing plate 24. As a result, there can be provided a color display state corresponding to the colors of the color filter elements 22R, 22G, and 22B.

As described hereinabove, the liquid crystal device 100 of the embodiment employs a so-called fringe field switching (FFS) mode. In the FFS mode, each of the sub pixels SG has the reflective display region R and the transmissive display region T, as well as the phase difference film 26 is provided corresponding to the reflective display region R in the cell. Under optimized optical design conditions, the phase difference film 26 is formed in the reflective display region R partitioned by the partition wall member 61. This suppresses a change in the phase difference value at the outer periphery of the phase difference film 26, thus reducing influence on display. Thereby, there is realized transmissive and reflective displays that reduce contrast loss caused by light leakage at the outer periphery of the phase difference film 26 upon black display.

Method for Producing the Liquid Crystal Device

Figure 5:
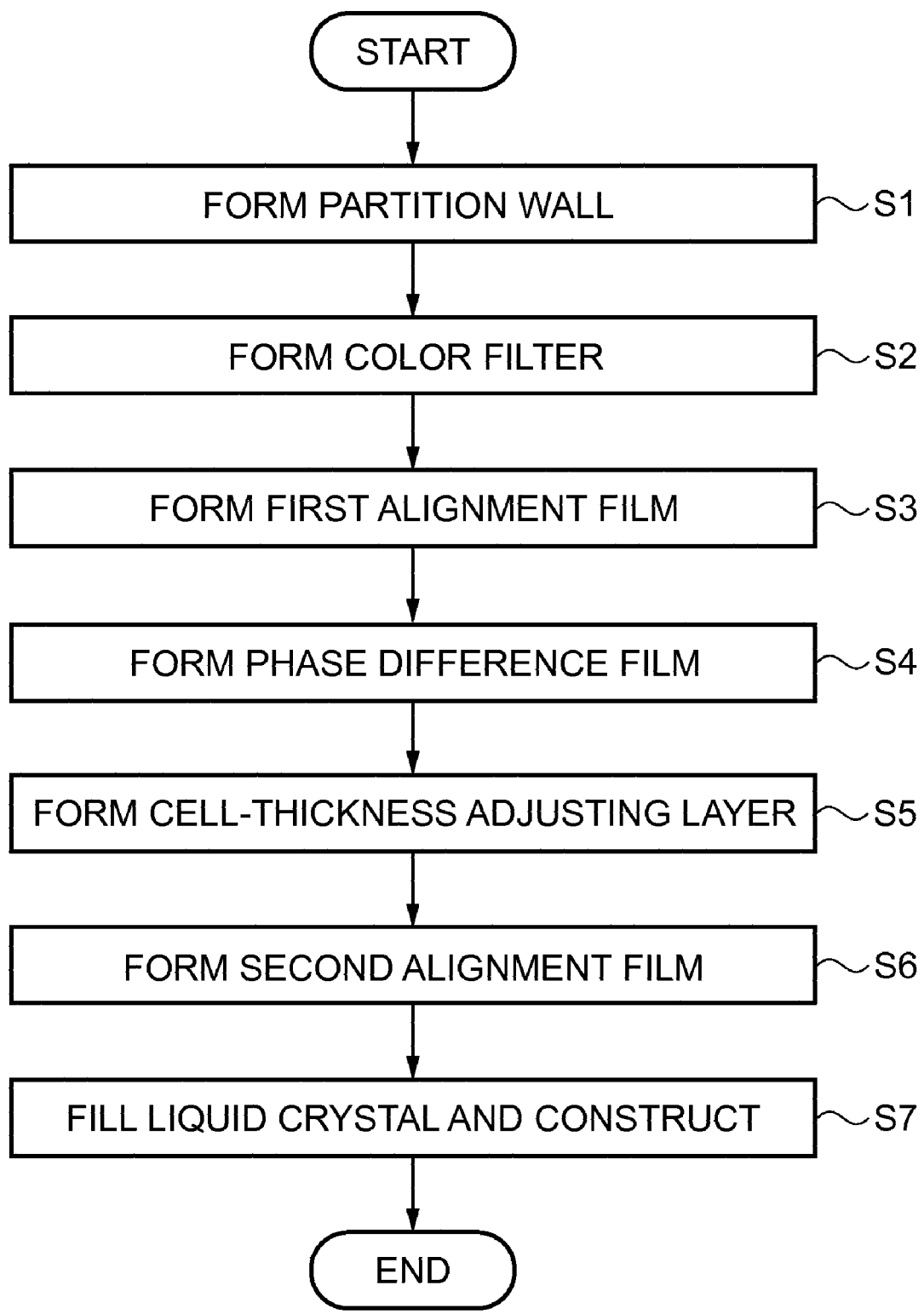
FIG. 5 is a flowchart showing a method for producing the liquid crystal display.

Next will be described a method for producing the liquid crystal device 100 of the embodiment. FIG. 5 is a flowchart showing the producing method. FIGS. 6A to 6E and FIGS. 7F to 7J are schematic sectional views of the producing method.

As shown in FIG. 5, the method for producing the liquid crystal device 100 includes forming the partition wall member 61 (step S1) and forming the color filter 22 in the region partitioned by the partition wall member 61 (step S2). In addition, the method includes forming the alignment film 23 as a first alignment film (step S3) and forming the phase difference film 26 by applying a liquid containing a material of the phase difference film and then drying the applied liquid (step S4). The method further includes forming the cell-thickness adjusting layer 27 on the formed phase difference film 26 (step S5); forming the alignment film 28 as a second alignment film (step S6); and constructing after filling a liquid crystal between the element substrate 10 and the opposing substrate 20 (step S7).

Figure 6A:
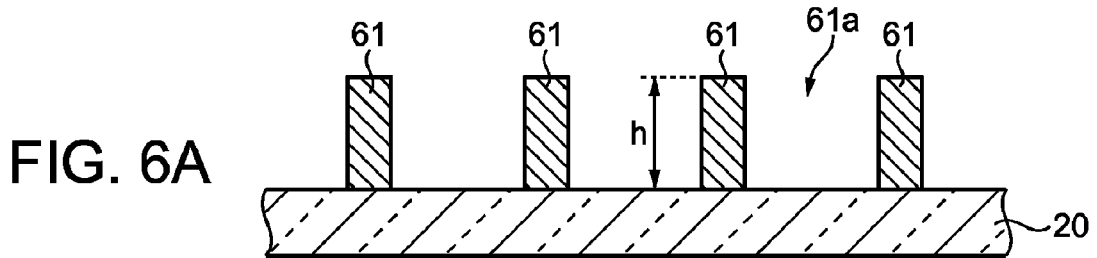
FIGS. 6A to 6E are schematic sectional views showing the method for producing the liquid crystal device.

Step S1 of FIG. 5 involves forming the partition wall member. At step S1, as shown in FIG. 6A, the partition wall member 61 is formed so as to have a plurality of openings 61a. Specifically, for example, on the first surface of the opposing substrate 20, a light-shielding material for the partition wall member is applied by printing such as offset printing to provide patterning, or a photosensitive material for the partition wall member is applied with a predetermined film thickness to be subjected to exposure and development, thereby forming a pattern of the partition wall member 61. The partition wall member 61 is formed to partition sub pixel regions so as to have openings therein, as well as to partition the reflective display region R from the transmissive display region T (See FIGS. 3A and 3B). A film thickness of the partition wall member 61, namely a height h of the partition wall member 61 is adjusted so as to be a height enough to partition the respective color filter elements 22R, 22G, and 22B of the color filter 22, the alignment film 23, the phase difference film 26, and the cell-thickness adjusting layer 27, which will be formed later together. Then, next will be step S2.

Figure 6B:
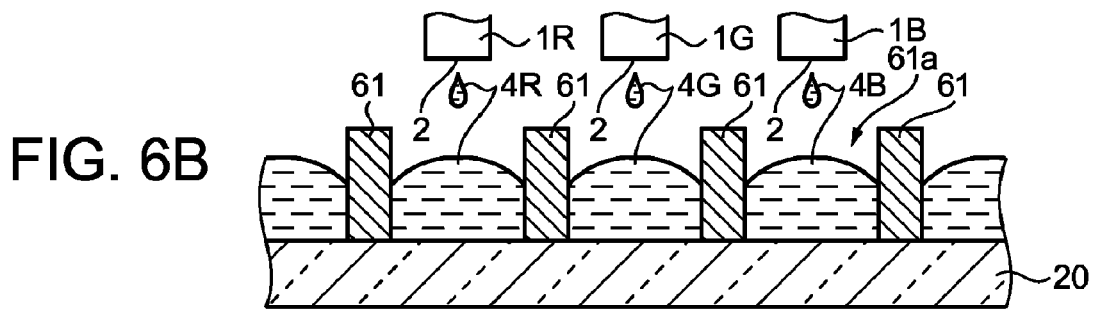

Step S2 of FIG. 5 involves forming the color filter. At step S2, first, as shown in FIG. 6B, three different color liquids 4R, 4G, and 4B each containing a filter element forming material are applied in respective desired openings 61a (in other words, the respective sub pixels). In the present embodiment, the three different color liquids 4R, 4G, and 4B, respectively, are filled in different discharging heads 1R, 1G, and 1B, respectively. Then, relative scanning operation is performed between the discharging heads 1R, 1G, and 1B and the opposing substrate 20 to discharge droplets of the three different color liquids from a plurality of nozzles 2 provided in each of the discharging heads 1R, 1G, and 1B. In this case, the three different color liquids 4R, 4G, and 4B may be approximately simultaneously discharged or individually discharged. For example, using inkjet heads as the discharging heads 1R, 1G, and 1B enables necessary amounts of the liquids 4R, 4G, and 4B to be accurately and unwastefully applied in the respective desired openings 61a.

Preferably, before applying the liquids 4R, 4G, and 4B, a lyophilic treatment is performed on an applying surface of the opposing substrate 20 having the partition wall member 61 formed thereon, whereas a lyophobic treatment is performed on the partition wall member 61. The lyophilic treatment may be a plasma treatment using oxygen gas as a process gas, and the lyophobic treatment may be a plasma treatment using $CF_4$ as a process gas. Performing such surface treatments enables the liquids 4R, 4G, and 4B to be evenly applied in the openings 61a.

Figure 6C:
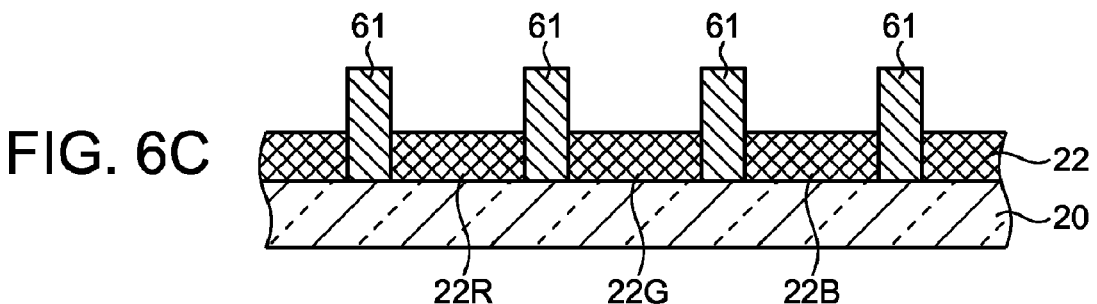

Next, the applied liquids 4R, 4G, and 4B are dried to remove a solvent component, whereby, as shown in FIG. 6C, the filter elements 22R, 22G, and 22B, respectively, corresponding to red (R), green (G), and blue (B), respectively, can be formed with respective predetermined film thicknesses (ranging approximately from 1.5 to 2 μm). Next will be step S3.

Figure 6D:
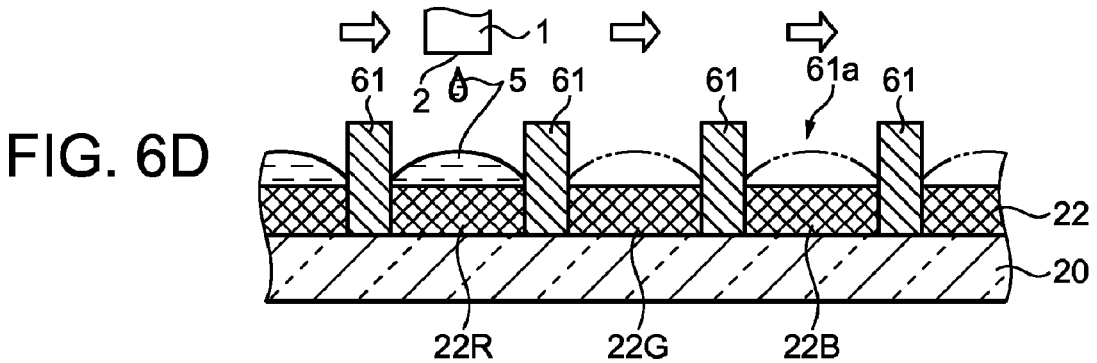

Step S3 of FIG. 5 involves forming the first alignment film. At step S3, as shown in FIG. 6D, first, a liquid 5 containing a photosensitive material of the alignment film is applied on the filter element in the reflective display region R partitioned by the partition wall member 61. Like formation of the color filter, the liquid 5 is filled in the discharging head 1, then, relative scanning operation between the discharging head 1 and the opposing substrate 20 is performed to discharge a droplet from each of the nozzles 2 provided in the discharging head 1. Although the partition wall member 61 partitions the reflective and the transmissive display regions R and T from each other, it is not shown in the drawings, since the liquid 5 does not need to be discharged in the transmissive display region T.

Figure 6E:
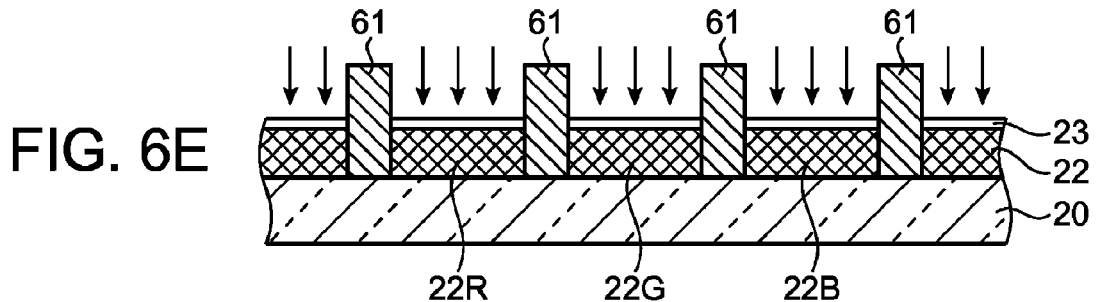

Next, as shown in FIG. 6E, the applied liquid 5 is dried and irradiated by polarized UV light (as shown by arrows) to cure the liquid while allowing photo-alignment. Thereby, the alignment film 23 is formed in the reflective display region R. The photosensitive alignment film may be made of a photosensitive polyimide resin, for example. Then, next will be step S4.

Figure 7F:
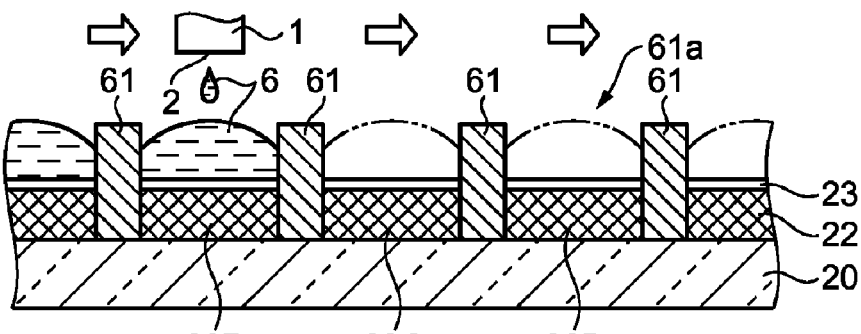
FIGS. 7F to 7J are also schematic sectional views showing the method for producing the liquid crystal device.

Step S4 of FIG. 5 involves forming the phase difference film. At step 4, first, as shown in FIG. 7F, a liquid 6 containing a material of the phase difference film is applied in the reflective display region R partitioned by the partition wall member 61 (Application step of the liquid 6). Also in this case, the liquid droplet discharging method (the inkjet method) is used to discharge a droplet of the liquid 6 filled in the discharging head 1 from each of the nozzles 2 provided in the discharging head 1. Additionally, since a surface of the alignment film 23 where the liquid 6 is applied is likely to be lyophobic to the liquid 6, a lyophilic treatment as above is preferably performed on the surface thereof.

In the application step of the liquid 6, an amount of application of the liquid 6 is varied corresponding to the respective filter elements 22R, 22G, and 22B. Using the liquid droplet discharging method enables a droplet of a desired amount of the liquid 6 to be discharged in a desired region.

Figure 7G:
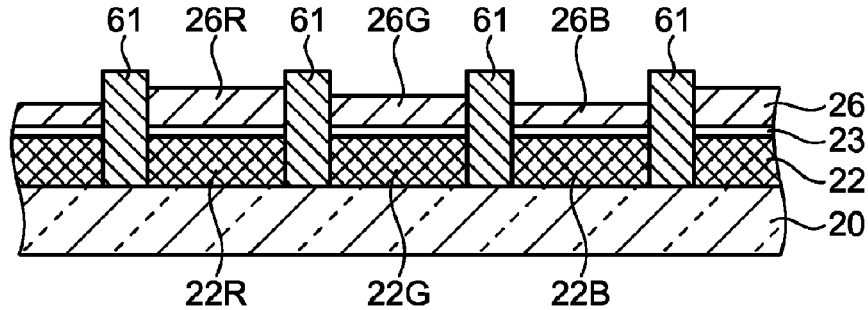

Next, as shown in FIG. 7G, the applied liquid 6 is dried and solidified to form the phase difference films 26R, 26G, and 26B having different film thicknesses (a step of film deposition). In this case, the film thickness (the amount of application) is set based on a phase difference value of the phase difference film 26G. The thickness of the phase difference film 26G is approximately 1.5 to 2 μm, and the phase difference value of the film 26G is approximately 265 to 275 nm. The phase difference film 26R has a thickness larger than that of the phase difference film 26G, whereas the phase difference film 26B has a thickness smaller than that of the phase difference film 26G. Obviously, setting of the film thicknesses is influenced by a material of the phase difference film selected.

An example of the polymerizable liquid crystal compound used as the material of the phase difference film is Paliocolor LC242 (manufactured by BASF Ltd.). LC242 is a photo-polymerizable material. An example of a composition of the liquid 6 using the LC242 will be described below.

Example

As the material of the phase difference film, LC242 having a concentration of 30 wt % was prepared.

A photo-polymerization initiator was 2-methyl-1[4-(methylthio) phenyl]-2-morpholino-propan-1-one. Specifically, 3 wt % of Irgacure 907 (made by Ciba Specialty Chemicals Ltd.) was added to LC242.

A solvent used was a PGMEA (2-acetoxy-1-methoxypropane) solution with a concentration of 70 wt %.

Figures 8, 9:
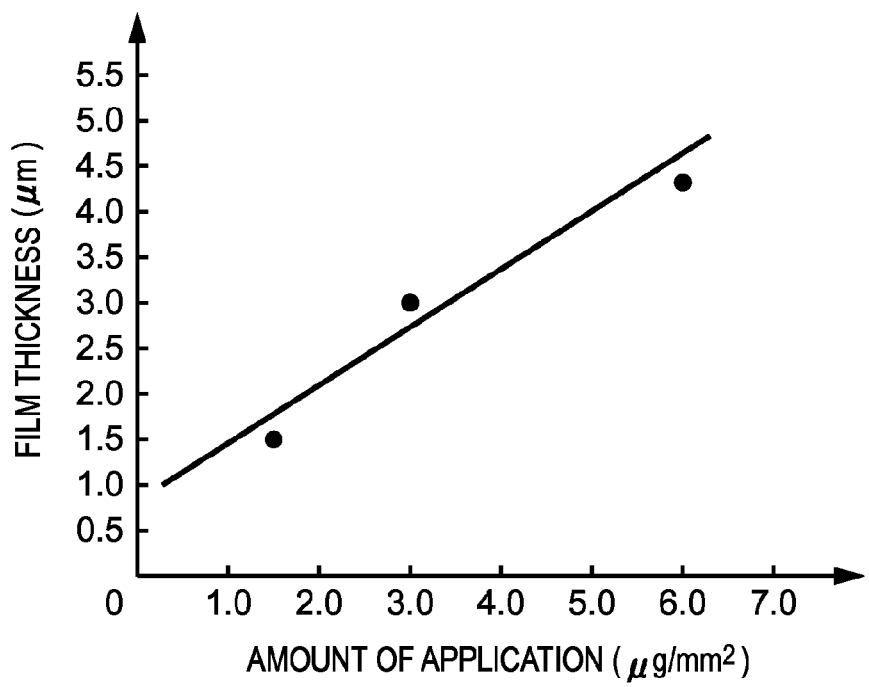
FIG. 8 is a table showing evaluation results of solubility of a solute in a liquid.
FIG. 9 is a graph showing relationships between amounts of application of the liquid and film thicknesses.

The LC242 as a solute is insoluble in the PGMEA as the solvent at room temperature. Thus, the solute was added to the solvent heated at approximately 70° C., and the mixture was stirred. Then, solubility of the solute was evaluated. FIG. 8 is a table showing evaluation results of the solubility of the solute in the liquid.

As shown in FIG. 8, even when the mixture was allowed to stand for 100 H (hours) at room temperature after dissolved at 70° C., the solute was not precipitated at a solute concentration of 30 to 50 wt %. At a concentration of 60 to 70 wt %, the solute was once dissolved in the solvent at 70° C., and then precipitated after allowed to stand for 24 H at room temperature. At a concentration of 80 wt %, similarly, precipitation of the solute was observed after left for 8 H at room temperature. At a solute concentration of 90 wt %, the solute was not dissolved even in the solvent heated at 70° C. Thus, when considering stability of the solute as the liquid 6, the solute concentration is preferably 50 wt % or less. To discharge the solute by using the liquid droplet discharging method, preferably, the solute is prepared to have a viscosity of 3 mPa-s or more and 20 mPa-s or less. In the present example, the solute concentration was set to 30 wt %, and the viscosity was approximately 10 mPa-s.

The liquid 6 prepared as above was discharged on the opposing substrate 20 in an amount of 10 ng per liquid droplet. Then, the opposing substrate 20 was heated to dry the applied liquid 6, for example, by allowing the opposing substrate 20 to stand on a heated hot plate or by placing the opposing substrate 20 in a drying oven. For example, when the opposing substrate 20 is allowed to stand on the hot plate heated at 70° C., the liquid 6 can be dried in a few tens of seconds.

A thin film obtained after drying as above was irradiated by UV light with a wavelength of approximately 365 nm and a dose of 400 mJ/cm$^2$, whereby photo-polymerization occurred to deposit the phase difference film 26. Preferably, UV irradiation is performed under a nitrogen (N$_2$) atmosphere, which can reduce inhibition of photo-polymerization due to oxygen (O$_2$) in the air.

FIG. 9 is a graph showing relationships between amounts of application of the liquid and film thicknesses. As shown in the drawing, it is found that applying the liquid 6 of the above example in a range of amounts of 1.0 to 6.0 μg/mm$^2$ enables the thickness of the phase difference film 26 to be controlled in a range of 1.5 to 4.5 μm.

Thus, using the liquid 6 as above enables the respective phase difference films 26R, 26G, and 26B having mutually different film thicknesses to be formed by adjusting an applying amount of the liquid 6 for each color of the color filter, as shown in FIG. 7G. A phase difference value of each of the phase difference films is obtained by multiplying a double refractive index Δn of the material of the phase difference film by a film thickness t. For example, assuming that the phase difference value is λ/2, when the double refractive index Δn of the material of the phase difference film is 0.14, the thickness of the phase difference film 26R is set to 2.32 μm to obtain a phase difference value of 325 nm, which is half a red (R) light wavelength of 650 nm. Similarly, when the phase difference film 26G has a thickness of 1.96 μm, the phase difference value obtained is 275 nm, half a green (G) light wavelength of 550 nm. Additionally, the phase difference film 26B with a thickness of 1.61 μm has a phase difference value of 225 nm, half a blue (B) light wavelength of 450 nm.

The photo-polymerization initiator is not restricted to that shown above. Depending on the wavelength of UV light, the photo-polymerization initiator has different UV-absorption characteristics. Thus, desirably, the photo-polymerization initiator is selected in consideration of wavelength characteristics of a UV irradiation device, along with adjustment of an amount of the initiator added to the material of the phase difference film. In addition, obviously, the initiator needs to be selected considering a chemical structure of the material of the phase difference film.

The material of the phase difference film is not restricted to the photo-polymerizable liquid crystal compound described above. For example, the phase difference film 26 may be made of a thermally polymerizable compound. When using a thermally polymerizable material, unlike formation of the phase difference film 26 by a so-called photolithography, it is unnecessary to use a photosensitive material having an easily colorable photosensitive group. As a result, the phase difference film 26 deposited can be more transparent. On the other hand, preferably, heating conditions are set in consideration of variations in the film thickness caused by heating upon thermal polymerization. Then, next will be step S5.

Figure 7H:
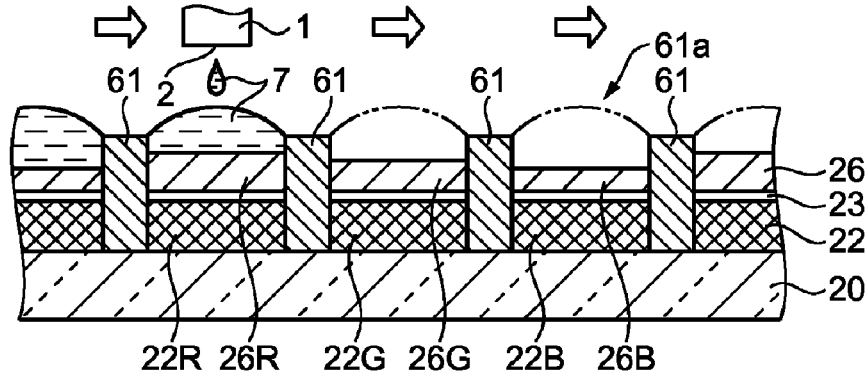

Step S5 of FIG. 5 involves forming the cell-thickness adjusting layer. At step S5, first, as shown in FIG. 7H, a liquid 7 containing a material of the cell-thickness adjusting layer is applied in the reflective display region R partitioned by the partition wall member 61. Also in this case, the liquid droplet discharging method (the inkjet method) is used to fill the liquid 7 in the discharging head 1 and then to discharge a droplet of the liquid 7 from each of the nozzles 2 of the discharging head 1 by relative scanning operation between the head 1 and the opposing substrate 20.

The cell-thickness adjusting layer is made of the mentioned-above acryl resin having photocurable characteristics. An amount of application of the liquid 7 is varied among the phase difference films 26R, 26G, and 26B such that a film surface after deposition is flattened in the respective openings 61a.

Figure 7I:
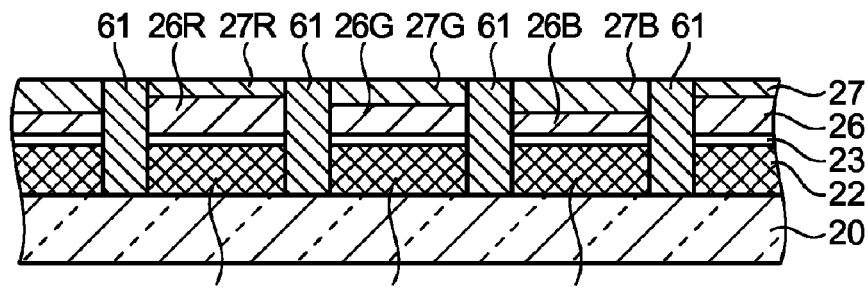

Next, as shown in FIG. 7I, the liquid 7 is cured by UV irradiation to form the cell-thickness adjusting layers 27R, 27G, and 27B. The thickness of the cell-thickness adjusting layer 27 is set such that the cell thickness in the reflective display region after constructing the cell is half the cell thickness d of the transmission display region T. Next will be step S6.

Figure 7J:
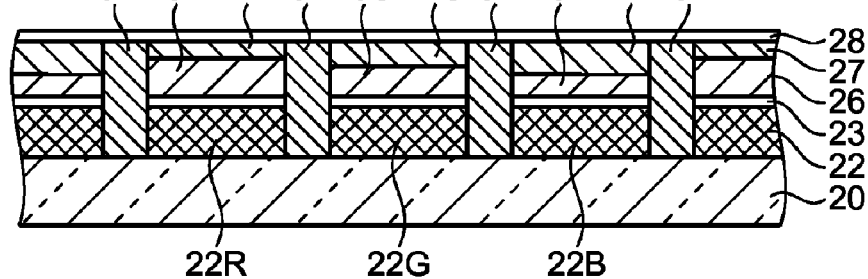

Step S6 of FIG. 5 involves forming the second alignment film. At step S6, as shown in FIG. 7J, the alignment film 28 as the second alignment film is formed so as to cover the partition wall member 61 and the cell-thickness adjusting layers 27R, 27G, and 27B. To form the alignment film 28, there is prepared an organic solution containing polyimide or polyamic acid as an alignment film material. The solution is applied, and then dried and burned to remove a solvent component, thereby obtaining a deposit film. The alignment film material may be applied by spin coating, slit coating, offset printing, a liquid droplet discharging method, or the like. The alignment film 28 deposited is subjected to surface treatment such as rubbing in a predetermined direction. Next will be step S7.

Step S7 of FIG. 5 involves constructing after filling a liquid crystal. At step S7, as shown in FIGS. 3A and 3B, the element substrate 10 having pixel-constituting elements such as the pixel electrodes 9 and the common electrodes 19 is arranged to oppose the opposing substrate 20 at a predetermined position, whereby both substrates 10 and 20 are bonded with each other via a sealant. The liquid crystal layer 50 is formed by filling liquid crystal between the element substrate 10 and the opposing substrate 20. When filling the liquid crystal, for first, on one substrate of the pair of substrates 10 and 20, the sealant may be formed in a frame-like shape by a printing or discharging method. Next, in a vacuum environment, a necessary amount of the liquid crystal may be dropped in a region inside the sealant as a droplet-receiving portion, followed by bonding of both substrates together. A preferable sealant is a thermally curable epoxy adhesive, for example. The thickness of the liquid crystal layer 50 is set such that the thickness of the liquid crystal layer 50 in the reflective display region R after constructing the cell is half the cell thickness d of the transmission display region T.

Then, the upper and the lower polarizing plates 24 and 14, respectively, are attached on a top surface and a bottom surface, respectively, of the cell thus obtained, thereby constructing the liquid crystal device 100. The liquid crystal device 100 as a product is connected to a driving circuit that drives the device, as well as, at a back side adjacent to the second surface of the element substrate 10 is provided an illumination device that illuminates the device. The illumination device includes a light-emitting diode (LED) or a cold-cathode tube as a light source and a guiding plate that guides light from such a light source to the liquid crystal device 100.

In the method for producing the liquid crystal device 100, the liquid droplet discharging method is used at least in process steps of forming the color filter (step S2), of forming the first alignment film (step S3), of forming the phase difference film (step S4), and of forming the cell-thickness adjusting layer (step S5). Accordingly, as compared to using photolithography in those process steps, production process steps can be simplified. In addition, desired thin films can be formed using the respective liquids 4 to 7 without any waste. Moreover, the phase difference film 26 is partitioned by the partition wall member 61 having light-shielding properties, which suppresses a change in the phase difference value at the outer periphery of the phase difference film 26, thus hardly causing light leakage, as well as which prevents the light leakage from being induced in the transmissive display region T. Consequently, the liquid crystal device 100 produced by the above method can provide excellent display images.

Second Embodiment

Figure 10:
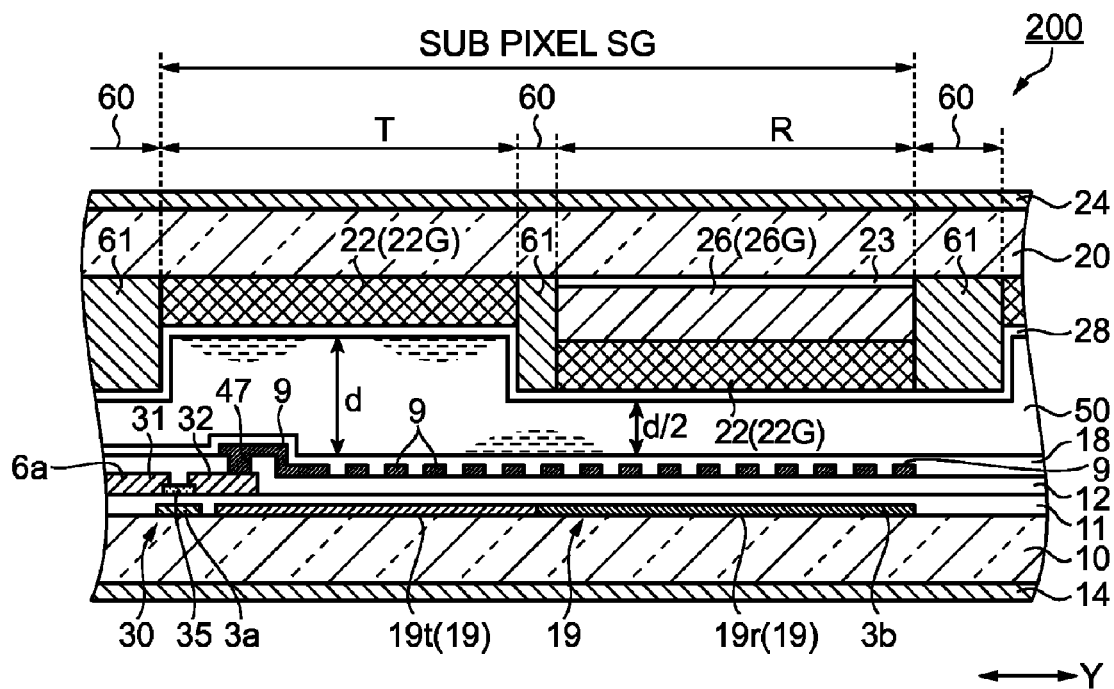
FIG. 10 is a schematic sectional view showing a structure of a liquid crystal device according to a second embodiment of the invention.

Next, another liquid crystal device will be described with reference to FIG. 10. FIG. 10 is a schematic sectional view showing a liquid crystal device according to a second embodiment of the invention. In the liquid crystal device of the second embodiment, an equivalent circuit and the element substrate 10 have the same structures as those of the liquid crystal device 100 of the first embodiment, whereas the opposing substrate 20 has a structure different from that of the first embodiment. Accordingly, the same constituent elements as those in the first embodiment are given the same reference numerals.

As shown in FIG. 10, a liquid crystal device 200 of the second embodiment is structured such that the alignment film 23, the phase difference film 26 (26G), the color filter 22 (the filter element 22G) are laminated sequentially in the above-mentioned order in a direction toward the liquid crystal layer 50, in the reflective display region R partitioned by the partition wall member 61 on the opposing substrate 20. Thus, the filter element 22G is laminated on the phase difference film 26 (26G) formed in the reflective display region R.

Depending on selection of the material of the phase difference film 26, physical characteristics (such as surface hardness) of the formed phase difference film 26 can be deteriorated. In this case, the phase difference film 26 cannot withstand against alignment treatment such as rubbing performed to align liquid crystal molecules, so that problems occurs such as shaving of a treated surface of the phase difference film 26. In addition, if an impurity such as an ion component is contained in the phase difference film 26, the impurity is likely to be diffused in the liquid crystal layer 50 as time passes, thereby changing optical characteristics of the layer, even though the phase difference film 26 is covered by the alignment film 28. In the liquid crystal device 100 of the first embodiment, the cell-thickness adjusting layer 27 is provided so as to cover the phase difference film 26, so that the cell-thickness adjusting layer 27 can serve as a protective layer preventing such problems.

In the liquid crystal device 200, the filter element 22G is formed on the phase difference film 26 to use the filter element 22G as the protective layer as above. Thus, the liquid crystal layer 200 of the second embodiment is structurally simpler than the liquid crystal device 100 of the first embodiment.

As compared to the method of the first embodiment, in the method of the second embodiment, the order of steps from S1 to S4 may be changed, and step S5 of forming the cell-thickness adjusting layer may be excluded. Accordingly, after forming the partition wall member 61 on the opposing substrate 20, the alignment film 23 may be formed in the reflective display region R. Then, the phase difference film 26 may be formed in the reflective display region R, followed by formation of the color filter 22 thereon. Those process steps use the liquid droplet discharging method (the inkjet method). Accordingly, the alignment film 23, the phase difference film 26, and the color filter 22 can be selectively formed in the reflective display region R. In the formation of the phase difference film 26, material selection and film thickness adjustment should be made such that the cell-thickness adjusting layer 27 is not required, although it is obvious enough.

Consequently, the above-described method according to the second embodiment can more efficiently produce the semi-transmissive reflective liquid crystal device 200 throughout the simplified production process steps.

Third Embodiment

Figure 11:
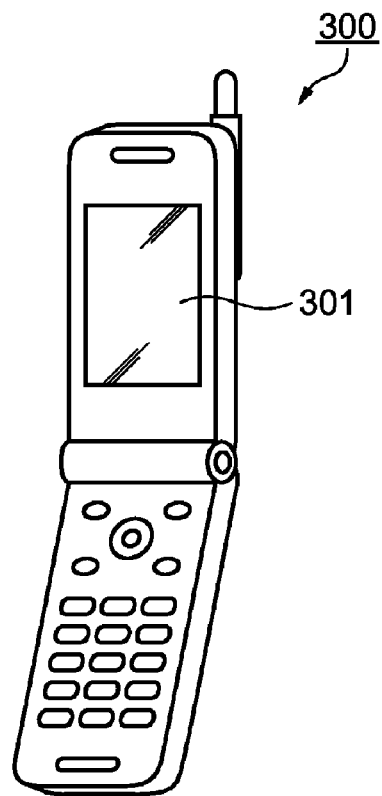
FIG. 11 is a schematic perspective view showing a mobile phone as an electronic apparatus according to an embodiment of the invention.

Next will be described an electronic apparatus according to a third embodiment including the liquid crystal device, with reference to FIG. 11. FIG. 11 is a schematic sectional view showing a mobile phone as the electronic apparatus.

As shown in FIG. 11, a mobile phone 300 as the electronic apparatus of the third embodiment has a main body including an operating input section and a display section 301. The display section 301 incorporates the liquid crystal device 100 or 200 and an illumination device that illuminates the liquid crystal device. Accordingly, the apparatus allows recognition of information displayed by transmissive display using transmitted light from the illumination device and reflective display using incident light such as external light. That is, under a sufficiently bright condition such as an outdoor environment, a reflective display mode enables information to be recognized without driving the illumination device. Thus, the mobile phone 300 realizes power consumption reduction and offers a long battery life.

The mobile phone 300 includes the liquid crystal 100 of the first embodiment, the liquid crystal device 200 of the second embodiment, the liquid crystal device 100 produced by the method according to the first embodiment, or the liquid crystal device 200 produced by the method according to the second embodiment. Accordingly, the mobile phone 300 provides a high-visual display quality and an excellent cost performance ratio.

Other than the above embodiments, various modifications may be considered. Some modifications will be described below.

First Modification

Figure 12A:
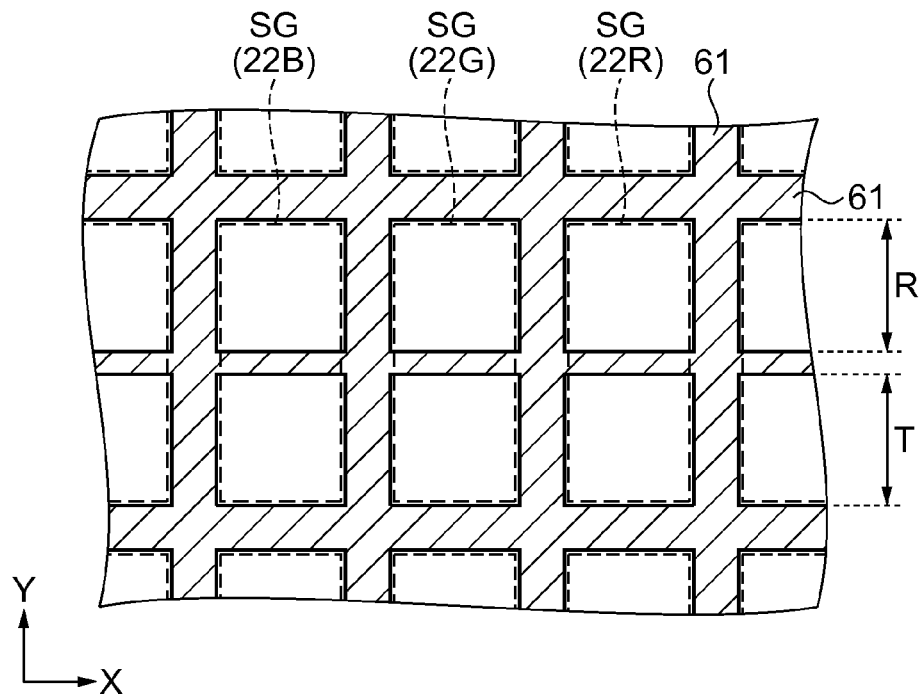
FIGS. 12A and 12B are schematic plan views showing different layouts of a partition wall member.
Figure 12B:
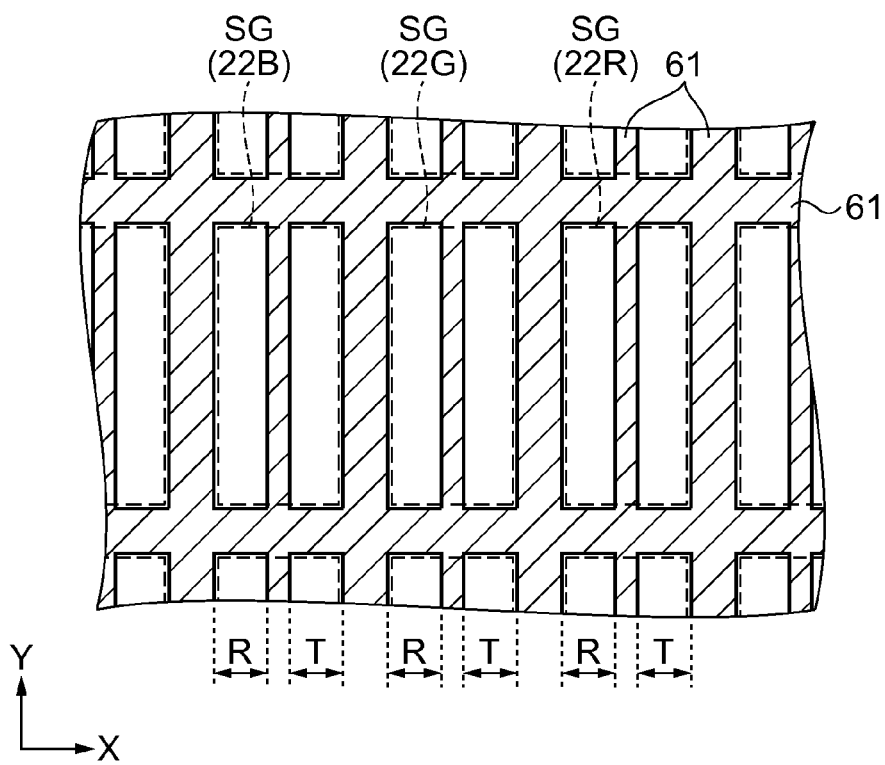

In the liquid crystal device 100 of the first embodiment, the layout of the partition wall member 61 is not restricted to that shown above. FIGS. 12A and 12B are schematic plan views showing other layout patterns of the partition wall member 61. In the first embodiment, as shown in FIG. 12A, the partition wall member 61 is provided in a lattice pattern to partition the respective sub pixels SG (substantially, the respective filter elements 22R, 22G, and 22B), as well as to partition the reflective display region R from the transmissive display region T in the Y-axis direction (a direction in which same-color filter elements are arranged in a striped pattern). In contrast, as shown in FIG. 12B, the reflective display region R and the transmissive display region T may be partitioned from each other in an X-axis direction orthogonal to the Y-axis direction. Thus, when partitioning the reflective display region R from the transmissive display region T by the partition wall member 61, more effective layouts of the display regions R and T may be determined in consideration of shapes, visual angle characteristics and the like of the sub pixels SG. Other than that, inside each of the sub pixels SG, the reflective display region R may be provided independently in an island shape.

Second Modification

In the liquid crystal device 100 of the first embodiment, layouts of the partition wall member 61, the phase difference film 26, and the cell-thickness adjusting layer 27 are not restricted to those shown above. For example, in FIGS. 3A and 3B, the color filter 22 may be provided at a side adjacent to the opposing substrate 20, and the partition wall member 61, the phase difference film 26, and the cell-thickness adjusting layer 27 may be provided at a side adjacent to the element substrate 10. This structure also can provide similar advantageous effects. In addition, the side adjacent to the opposing substrate 20 is structurally simplified, so that the opposing substrate 20 is available as a raw material substrate including the color filter 22 from external manufacturers. Furthermore, the cell-thickness adjusting layer 27 may not necessarily be provided. In this case, it may be only necessary to adjust the thickness of the phase difference film 26 providing the phase difference value of λ/2 such that the cell thickness of the reflective display region R is d/2 with respect to the cell thickness d of the transmissive display region T.

Third Modification

In the liquid crystal device 100 of the first embodiment, the structure of the sub pixel SG realizing the reflective display region R is not restricted to providing the reflective common electrode 19r having light reflectivity. For example, the transparent common electrode 19t may be provided in the same size as that of the pixel electrode 9 in a two-dimensional view, and a reflecting layer having light reflectivity may be provided as an underlayer of the transparent common electrode 19t. The reflecting layer may be formed by depositing a thin film made of a metal such as Al or Ag on a resin layer having a plurality of concave and convex portions. The reflecting layer as above is formed to correspond to the reflective display region R. This can reduce directivity of light reflected by the reflecting layer, thereby realizing brighter reflective display.

Fourth Modification

In the liquid crystal device 100 of the first embodiment, layouts of the three different color filter elements 22R, 22G, and 22B are not restricted to the striped pattern. For example, the structure of the phase difference film 26 of the first embodiment may also be applied to a layout of a mosaic or delta pattern. In addition, colors included in the color filter 22 are not restricted to the above three colors. The color filter 22 may be of a multicolor type including at least one color in addition to red, green, and blue. Furthermore, the liquid crystal device 100 may be applicable to a semi-transmissive reflective liquid crystal panel allowing only a so-called monochrome display, without including the color filter 22.

Fifth Modification

The liquid crystal device 100 of the first embodiment and the liquid crystal device 200 of the second embodiment are not restricted to the semi-transmissive reflective liquid crystal device of the FFS mode. For example, the liquid crystal devices 100 and 200 may also be applicable to a semi-transmissive reflective liquid crystal panel of the IPS mode or a vertical alignment (VA) mode. In addition, instead of the TFT 30, a thin film diode (TFD) element may be used as a switching element. Furthermore, the liquid crystal devices 100 and 200 are not restricted to the active-mode liquid crystal device including the switching element and may also be applicable to a liquid crystal device of a simple matrix mode.

Sixth Modification

In the method for producing the liquid crystal device 100 of the first embodiment, the method for forming the color filter 22 is not restricted to the liquid droplet discharging method. For example, after forming the color filter 22 by photolithography, the partition wall member 61 may be formed on the color filter 22.

Seventh Modification

In the method for producing the liquid crystal device 100 of the first embodiment, the method for forming the alignment film 23 defining the direction of the slow axis of the phase difference film 26 is not restricted to the method in which the liquid 5 is applied in each opening 61a by the liquid droplet discharging method and subjected to UV irradiation to provide photo-alignment. For example, the liquid 5 containing an alignment film material may be applied by spin coating or roll coating to perform patterning, or may be patterned by printing such as offset printing.

Eighth Modification

In the method for producing the liquid crystal device 100 of the first embodiment, forming the cell-thickness adjusting layer (step S5) is not essential. For example, the thickness of the phase difference film 26 may be adjusted by selecting the phase difference film material such that adjustment of the cell thickness is unnecessary.

Ninth Modification

In the method for producing the liquid crystal device 100 of the first embodiment, the structure of varying the respective thicknesses of the phase difference film 26 and the cell-thickness adjusting layer 27 for each display color may be modified. For example, the thickness of each of the phase difference film 26 and the cell-thickness adjusting layer 27 may be equalized regardless of display colors. Thereby, the production process can be more simplified since adjustments of the film thicknesses thereof are not excluded.

Tenth Modification

The method for producing the liquid crystal device 200 of the second embodiment is not restricted to that described above. For example, first, after forming the alignment film 23 on the opposing substrate 20, rubbing may be performed thereon to control the direction of the slow axis. Next, the partition wall member 61 may be formed by a printing process such as offset printing or reprinting, and thereafter, the phase difference film 26 may be formed in the reflective display region R partitioned by the partition wall member 61. Then, the respective color filter elements 22R, 22G, and 22B of the color filter 22 may be formed in the sub pixel region partitioned by the partition wall member 61. Thereby, rubbing treatment can be used to control the slow axis of the phase difference film 26, so that the direction of the slow axis can be stabilized without being disturbed by the partition wall member 61.

Eleventh Modification

In the third embodiment, the electronic apparatus including the liquid crystal device 100 or 200 is not restricted to the mobile phone 300. For example, the liquid crystal device 100 or 200 can also be suitably included in other various kinds of electronic apparatuses such as notebook personal computers, electronic organizers, viewers and DVD players displaying visual data, and mobile data terminals.

The entire disclosure of Japanese Patent Application No. 2007-306952, filed Nov. 28, 2007 is expressly incorporated by reference herein.

What is claimed is:

1. A liquid crystal device, comprising:
a pair of substrates;
a liquid crystal layer sandwiched between the pair of substrates;
a plurality of pixels each including a plurality of pixel regions, each of the pixel regions having a reflective display region and a transmissive display region;
a phase difference film provided in the reflective display region, the phase difference film being located at a side of one substrate of the pair of substrates adjacent to the liquid crystal layer; and
a partition wall member having light-shielding properties, the partition wall member being provided at the side of the one substrate adjacent to the liquid crystal layer to partition the phase difference film.

2. The liquid crystal device according to claim 1, further including a color filter that includes a plurality of different color filter elements and that is provided at the side of the one substrate adjacent to the liquid crystal layer; and wherein the partition wall member partitions the different color filter elements into each color filter element, as well as partitions the phase difference film.

3. The liquid crystal device according to claim 2, wherein each of the filter elements provided in the reflective display region of the one substrate is laminated on a surface of the phase difference film adjacent to the liquid crystal layer.

4. The liquid crystal device according to claim 2, wherein a film thickness of the phase difference film provided corresponding to at least one color filter element of the color filter elements included in each pixel region of the pixels is different from a film thickness of the phase difference film provided corresponding to at least another color filter element of the color filter elements.

5. The liquid crystal device according to claim 1, further including an alignment film provided at the side of the one substrate adjacent to the liquid crystal layer to define a direction of a slow axis of the phase difference film.

6. The liquid crystal device according to claim 1, further including a liquid-crystal-layer-thickness adjusting layer provided between the phase difference film and the liquid crystal layer in the reflective display region partitioned by the partition wall member to adjust a thickness of the liquid droplet layer in the reflective display region.

7. The liquid crystal device according to claim 6, wherein the liquid-crystal-layer-thickness adjusting layer is provided such that the thickness of the liquid crystal layer in the reflective display region is half a thickness of the liquid crystal layer in the transmissive display region.

8. A method for producing a liquid crystal device, comprising:
forming a partition wall member having light-shielding properties on a surface of one substrate of a pair of substrates to partition each of a plurality of pixels into a plurality of pixel regions, each of the pixel regions having a reflective display region and a transmissive display region, as well as to partition the reflective display region from the transmissive display region;
forming a phase difference film in the reflective display region partitioned by the partition wall member; and
constructing by bonding together the pair of substrates via a liquid crystal layer sandwiched between the substrates.

9. The method for producing a liquid crystal device according to claim 8, further including forming a color filter including a plurality of different color filter elements, each of the color filter elements being provided in each of the pixel regions partitioned by the partition wall member; and wherein forming the partition wall member includes forming the partition wall member such that a height of the partition wall member is greater than thicknesses of the filter elements, and forming the phase difference film includes forming the phase difference film such that the phase difference film is laminated on the filter element in the reflective display region partitioned by the partition wall member.

10. The method for producing a liquid crystal device according to claim 9, wherein forming the color filter includes forming the filter elements by applying a droplet of a liquid containing a material of each filter element in each pixel region partitioned by the partition wall member and then solidifying the liquid applied.

11. The method for producing a liquid crystal device according to claim 8, further including forming a color filter including a plurality of different color filter elements, each of the color filter elements being provided in each of the pixel regions; and wherein forming the partition wall member includes forming the partition wall member such that a height of the partition wall member is greater than a thickness of the phase difference film, and forming the color filter includes forming the filter elements such that each of the filter elements is laminated on the phase difference film in the reflective display region partitioned by the partition wall member.

12. The method for producing a liquid crystal device according to claim 8, further including forming an alignment film that defines a direction of a slow axis of the phase difference film before forming the phase difference film.

13. The method for producing a liquid crystal device according to claim 12, wherein forming the alignment film includes forming the alignment film by applying a droplet of a liquid containing a photosensitive material of the alignment film in the reflective display region partitioned by the partition wall member, then drying the liquid applied, and curing the liquid by light irradiation.

14. The method for producing a liquid crystal device according to claim 8, wherein forming the phase difference film includes applying a droplet of a liquid containing a material of the phase difference film in the reflective display region partitioned by the partition wall member and depositing a film by solidifying the liquid applied so as to obtain the phase difference film.

15. The method for producing a liquid crystal device according to claim 14, wherein upon application of the liquid of the material of the phase difference film, an amount of the liquid applied corresponding to at least one display color in the reflective display region is different from an amount of the liquid applied corresponding to at least another display color.

16. The method for producing a liquid crystal device according to claim 8, further including forming a liquid-crystal-layer-thickness adjusting layer in the reflective display region partitioned by the partition wall member to adjust a thickness of the liquid crystal layer in the reflective display region.

17. The method for producing a liquid crystal device according to claim 16, wherein forming the liquid-crystal-layer-thickness adjusting layer includes forming the liquid-crystal-layer-thickness adjusting layer such that the thickness of the liquid crystal layer in the reflective display region is half a thickness of the liquid crystal layer in the transmissive display region.

18. The method for producing a liquid crystal device according to claim 16, wherein forming the liquid-crystal-layer-thickness adjusting layer includes forming the liquid-crystal-layer-thickness adjusting layer by applying a droplet of a liquid containing a material of the liquid-crystal-layer-thickness adjusting layer in the reflective display region partitioned by the partition wall member and solidifying the liquid applied.

19. An electronic apparatus including the liquid crystal device according to claim 1 or a liquid crystal device produced by the method according to claim 8.

* * * * *